US012322321B2

(12) United States Patent
Lim et al.

(10) Patent No.: US 12,322,321 B2
(45) Date of Patent: Jun. 3, 2025

(54) DISPLAY DRIVING INTEGRATED CIRCUIT WITH TEMPERATURE COMPENSATION AND ADAPTIVE SCALING, DISPLAY DEVICE INCLUDING THE SAME, DISPLAY SYSTEM INCLUDING THE SAME, AND METHOD FOR DRIVING THE SAME

(71) Applicant: SAMSUNG DISPLAY CO., LTD., Yongin-si (KR)

(72) Inventors: Nam Jae Lim, Yongin-si (KR); Sung Jae Park, Yongin-si (KR); Seung Ho Park, Yongin-si (KR); Jin Ho Lee, Yongin-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 0 days.

(21) Appl. No.: 18/515,887

(22) Filed: Nov. 21, 2023

(65) Prior Publication Data

US 2024/0355262 A1 Oct. 24, 2024

(30) Foreign Application Priority Data

Apr. 21, 2023 (KR) ........................ 10-2023-0052711

(51) Int. Cl.
*G09G 3/30* (2006.01)
*G09G 3/20* (2006.01)
*G09G 3/32* (2016.01)

(52) U.S. Cl.
CPC ......... *G09G 3/2096* (2013.01); *G09G 3/2007* (2013.01); *G09G 3/32* (2013.01);
(Continued)

(58) Field of Classification Search
CPC .... G06F 3/0488; G06F 3/0416; G06F 3/0481; G06F 3/0484; G06F 3/167
See application file for complete search history.

(56) References Cited

U.S. PATENT DOCUMENTS 10,096,300 B2 10/2018 Cheon et al.
11,398,182 B2 7/2022 Park et al.
(Continued)

FOREIGN PATENT DOCUMENTS

KR 10-2006-0109651 10/2006
KR 10-0870686 11/2008
(Continued)

*Primary Examiner* — Roy P Rabindranath
(74) *Attorney, Agent, or Firm* — F. CHAU & ASSOCIATES, LLC

(57) ABSTRACT

A display device includes a display panel, a compensation circuit, a global temperature sensor, a global current sensor, a logic circuit, a timing controller, and a data driving circuit. The compensation circuit converts a sensed analog sensing voltage from a reference voltage line of a pixel of the display panel into a digital sensing value. The global current sensor measures an amount of current flowing through the display panel to generate a global current value. The logic circuit generates a scaling factor based on temperature data of the global temperature sensor, the global current value, the digital sensing value, and first image data. The timing controller scales first image data based on the first scaling factor to generate second image data. The data driving circuit that generates a data voltage based on the second image data for driving the data line.

20 Claims, 12 Drawing Sheets

(52) U.S. Cl.
CPC ............... *G09G 2300/0819* (2013.01); *G09G 2300/0842* (2013.01); *G09G 2320/041* (2013.01); *G09G 2330/021* (2013.01); *G09G 2370/00* (2013.01)

(56) References Cited

U.S. PATENT DOCUMENTS

| | | | | |
|---|---|---|---|---|
| 2007/0164931 | A1 | 7/2007 | Miyazaki | |
| 2016/0247458 | A1* | 8/2016 | Muto | G06F 1/3265 |
| 2021/0134923 | A1* | 5/2021 | Kim | H10K 50/844 |
| 2022/0108650 | A1* | 4/2022 | Park | G09G 3/32 |
| 2022/0208049 | A1* | 6/2022 | Oh | G09G 3/3208 |
| 2023/0012381 | A1* | 1/2023 | Lee | G09G 3/3291 |
| 2023/0154382 | A1 | 5/2023 | Park et al. | |

FOREIGN PATENT DOCUMENTS

| | | |
|---|---|---|
| KR | 10-2017-0097253 | 8/2017 |
| KR | 10-2022-0045592 | 4/2022 |
| KR | 10-2023-0073418 | 5/2023 |

* cited by examiner

FIG. 9

| LUT2 | |
|---|---|
| Temp (°C) | SFa |
| 25 | 1.00 |
| 30 | 0.95 |
| 35 | 0.85 |
| 40 | 0.80 |
| 45 | 0.75 |
| 50 | 0.70 |
| 55 | 0.65 |
| 60 | 0.60 |

FIG. 10

| LUT3 | | | | | | |
|---|---|---|---|---|---|---|
| | SFb | | | | | |
| Temp (°C) | FL = 100% | FL = 80% | FL = 60% | FL = 40% | FL = 20% | FL = 0% |
| 25 | 1.00 | 1.00 | 1.00 | 1.00 | 1.00 | 1.00 |
| 30 | 0.95 | 0.95 | 0.96 | 0.96 | 0.96 | 1.00 |
| 35 | 0.85 | 0.86 | 0.87 | 0.87 | 0.88 | 1.00 |
| 40 | 0.80 | 0.81 | 0.82 | 0.83 | 0.84 | 1.00 |
| 45 | 0.75 | 0.76 | 0.78 | 0.79 | 0.80 | 1.00 |
| 50 | 0.70 | 0.72 | 0.73 | 0.75 | 0.76 | 1.00 |
| 55 | 0.65 | 0.67 | 0.69 | 0.70 | 0.72 | 1.00 |
| 60 | 0.60 | 0.62 | 0.64 | 0.66 | 0.68 | 1.00 |

FIG. 11

| LUT4 | |
|---|---|
| FL (%) | Target GC (A) |
| 1 | 0.15 |
| 10 | 1.5 |
| 30 | 5 |
| 50 | 7.5 |
| 100 | 15 |

DISPLAY DRIVING INTEGRATED CIRCUIT WITH TEMPERATURE COMPENSATION AND ADAPTIVE SCALING, DISPLAY DEVICE INCLUDING THE SAME, DISPLAY SYSTEM INCLUDING THE SAME, AND METHOD FOR DRIVING THE SAME

CROSS-REFERENCE TO RELATED APPLICATION

This U.S. patent application claims priority under 35 U.S.C. § 119 (a) to Korean Patent Application No. 10-2023-0052711 filed in the Korean Intellectual Property Office on Apr. 21, 2023, the disclosure of which is incorporated by reference in its entirety herein.

(a) TECHNICAL FIELD

Embodiments of the present disclosure relate to a display driving integrated circuit, a display device including the same, a display system including the same, and a method for driving the same.

(b) DISCUSSION OF RELATED ART

A display device is used as a connection medium between a user and information. Examples of the display device include a liquid crystal display device and an organic light emitting display device.

In the organic light emitting display device, a light emitting element and a pixel circuit for supplying a driving current to the light emitting element may be disposed.

Meanwhile, when a temperature of the organic light emitting display device itself increases or a temperature of the surrounding environment in which the organic light emitting display device is disposed increases, an amount of the driving current flowing through the light emitting element may increase. Accordingly, an overcurrent may flow in the organic light emitting display device, thereby increasing power consumption.

SUMMARY

Example embodiments of the present disclosure provide a display driving integrated circuit that may control an overcurrent flowing in a display device, a display device including the same, a display system including the same, and a method for driving the same.

An embodiment of the present disclosure provides a display driving integrated circuit, including: a compensation circuit, a logic circuit, a timing controller, and a data driving circuit. The compensation circuit includes an analog-to-digital converter configured to convert an analog sensing voltage into a digital sensing value. The logic circuit generates a first scaling factor based on temperature data inputted from a temperature sensor, a global current value inputted from a current sensor, the digital sensing value, and first image data. The timing controller scales the first image data to generate second image data. The data driving circuit generates a data voltage based on the second image data.

The temperature data may be first temperature data corresponding to a global temperature. The logic circuit may include a compensation circuit that generates a local current value corresponding from the digital sensing value; a first logic circuit that compares the local current value with a reference current value to calculate second temperature data corresponding to a local temperature; a second logic circuit that generates third temperature data based on the first temperature data and the second temperature data; a third logic circuit that calculates a frame load value based on the first image data; a first scaling circuit that receives the third temperature data, the frame load value, and the first scaling factor over a plurality of frames, calculates a first intermediate scaling factor corresponding to the third temperature data, calculates a second intermediate scaling factor corresponding to the third temperature data and the frame load value, and generates and outputs a second scaling factor based on a difference value between the third temperature data received over the plurality of frames and a comparison result of comparing the first scaling factor and the second intermediate scaling factor; and a second scaling circuit that receives the frame load value, the second scaling factor, and the global current value, calculates a target global current value corresponding to the frame load value, and generates and outputs the first scaling factor based on a comparison result of comparing the global current value and the target global current value.

An embodiment of the present disclosure provides a display device including: a display panel, a compensation circuit, a global temperature sensor, a global current sensor, a logic circuit, a timing controller, and a data driving circuit. The display panel has a pixel including a pixel circuit electrically connected to a data line and a reference voltage line. The compensation circuit includes an analog-to-digital converter configured to convert a sensed analog sensing voltage from the reference voltage line into a digital sensing value. The global temperature sensor measures an ambient temperature of the display panel to output temperature data. The global current sensor measures an amount of current flowing through the display panel to generate a global current value. The logic circuit generates a first scaling factor based on the temperature data, the global current value, the digital sensing value, and first image data. The timing controller scales the first image data based on the first scaling factor to generate second image data. The data driving circuit generates a data voltage based on the second image data for driving the data line.

The temperature data may be first temperature data corresponding to a global temperature. The logic circuit may include a compensation circuit that generates a local current value from the digital sensing value; a first logic circuit that compares the local current value with a pre-stored reference current value to calculate second temperature data corresponding to a local temperature; and a second logic circuit generating third temperature data based on the first temperature data and the second temperature data.

The logic circuit may further include a third logic circuit that calculates a frame load value based on the first image data.

The logic circuit may further include a first scaling circuit that receives the third temperature data, the frame load value, and the first scaling factor over a plurality of frames, calculates a first intermediate scaling factor corresponding to the third temperature data, calculates a second intermediate scaling factor corresponding to the third temperature data and the frame load value, and generates and outputs a second scaling factor based on a difference value between the third temperature data received over the plurality of frames and a comparison result of comparing the first scaling factor and the second intermediate scaling factor; and a second scaling circuit that receives the frame load value, the second scaling factor, and the global current value, calculates a target global current value corresponding to the frame load value, and generates and outputs the first scaling factor based on a comparison result of comparing the global current value and the target global current value.

The second scaling circuit may calculate the target global current value corresponding to the frame load value with reference to a fourth lookup table, compare the calculated target global current value and the received global current value, and maintain, increase, or decrease the second scaling factor according to a result of comparing the target global current value and the global current value to output the second scaling factor as the first scaling factor.

The first scaling circuit may calculate the first intermediate scaling factor corresponding to the third temperature data with reference to a second lookup table, and calculate the second intermediate scaling factor corresponding to the third temperature data and the frame load value with reference to a third lookup table.

The first scaling circuit may calculate the difference value between the third temperature data obtained over the plurality of frames, and compare the calculated difference value with a predetermined reference value.

The first scaling circuit may compare the first scaling factor and the second intermediate scaling factor when the calculated difference value is less than the reference value, maintain the first scaling factor when the second intermediate scaling factor is equal to the first scaling factor, increase the first scaling factor when the second intermediate scaling factor is greater than the first scaling factor, decrease the first scaling factor when the second intermediate scaling factor is less than the first scaling factor, and output the first scaling factor that is maintained, increased, or decreased as the second scaling factor.

The first scaling circuit may compare the first scaling factor and the second intermediate scaling factor when the calculated difference value is equal to or greater than the reference value, output the first scaling factor as the second scaling factor when the second intermediate scaling factor is equal to the first scaling factor, and output the first intermediate scaling factor as the second scaling factor when the second intermediate scaling factor is different from the first scaling factor.

At least one of the data driving circuit, the timing controller, and the scaling factor provider may be mounted on an integrated circuit.

The display panel may include a display area in which the pixel is disposed and a non-display area around the display area, and the display device may further include a circuit film having one side attached to the non-display area and in which a display driving integrated circuit and the global current sensor are disposed.

The display device may further include a flexible circuit board attached to the other side of the circuit film and in which the global temperature sensor is disposed.

An embodiment of the present disclosure provides a display system including: a host, a display panel, a compensation circuit, a global temperature sensor, a logic circuit, a timing controller, and a data driving circuit. The host outputs first image data. The display panel has a pixel including a pixel circuit electrically connected to a data line and a reference voltage line. The compensation circuit includes an analog-to-digital converter configured to convert a sensed analog sensing voltage from the reference voltage line into a digital sensing value. The global temperature sensor measures an ambient temperature of the display panel to generate temperature data. The global current sensor measures an amount of current flowing through the display panel to generate a global current value. The logic circuit generates a first scaling factor based on the temperature data, the global current value, the digital sensing value, and first image data. The timing controller scales the first image data based on the first scaling factor to generate second image data. The data driving circuit generates a data voltage based on the second image data for driving the data line.

The global temperature sensor and the host may be mounted on one integrated circuit.

The temperature data may be first temperature data corresponding to a global temperature. The logic circuit may include a compensation circuit that generates a local current value based on the digital sensing value; a first logic circuit that compares the local current value with a reference current value to calculate second temperature data corresponding to a local temperature; a second logic circuit generating third temperature data based on the first temperature data and the second temperature data; a third logic circuit calculating a frame load value based on the first image data; a first scaling circuit and a second scaling circuit. The first scaling circuit receives the third temperature data, the frame load value, and the first scaling factor over a plurality of frames, calculates a first intermediate scaling factor corresponding to the third temperature data, calculates a second intermediate scaling factor corresponding to the third temperature data and the frame load value, and generates and outputs a second scaling factor based on a difference value between the third temperature data received over the plurality of frames and a comparison result of comparing the first scaling factor and the second intermediate scaling factor. The second scaling circuit receives the frame load value, the second scaling factor, and the global current value, calculates a target global current value corresponding to the frame load value, and generates and outputs the first scaling factor based on a result of comparing the global current value and the target global current value.

The second scaling circuit may calculate a target global current value corresponding to the frame load value with reference to a fourth lookup table, compare the calculated target global current value and the received global current value, and maintain, increase, or decrease the second scaling factor according to a result of comparing the target global current value and the global current value to output the second scaling factor as the first scaling factor, and The first scaling circuit may calculate a first intermediate scaling factor corresponding the third temperature data with reference to a second lookup table, and calculate a second intermediate scaling factor corresponding the third temperature data and the frame load value with reference to a third lookup table.

An embodiment of the present disclosure provides a driving method of a display system. The display system includes a first scaling circuit and a second scaling circuit. The driving method includes the second scaling circuit: receiving a global current value, a frame load value, and a second scaling factor; calculating a target global current value corresponding to the frame load value; comparing the target global current value and the global current value to generate a result; adjusting the second scaling factor according to the result to set a first scaling factor for scaling image data for the display system. The driving method further includes the first scaling circuit: receiving temperature data, the frame load value, and the first scaling factor; calculating a first intermediate scaling factor corresponding to the temperature data; calculating a second intermediate scaling factor corresponding to the temperature data and the frame load value; and comparing the first scaling factor and the second intermediate scaling factor for generating the second scaling factor.

The driving method of the display system may further include calculating a difference value between temperature data obtained over a plurality of frames; and comparing the calculated difference value with a preset reference value. When the calculated difference value is less than the reference value, the method may include performing one of maintaining the first scaling factor, increasing the first scaling factor, and decreasing the first scaling factor according to a comparison result of comparing the first scaling factor and the second intermediate scaling factor. When the calculated difference value is greater than or equal to the reference value, the method may include one of performing outputting the first scaling factor as the second scaling factor and outputting the first intermediate scaling factor as the second scaling factor according to the comparison result of comparing the first scaling factor and the second intermediate scaling factor.

According to the display driving integrated circuit, the display device including the same, the display system including the same, and the method for driving the same according to the embodiments of the present disclosure, it is possible to control an overcurrent flowing in a display device.

BRIEF DESCRIPTION OF THE DRAWINGS

FIG. 9 illustrates an example of a second lookup table according to an embodiment of the present disclosure.

FIG. 10 illustrates an example of a third lookup table according to an embodiment of the present disclosure.

FIG. 11 illustrates an example of a fourth lookup table according to an embodiment of the present disclosure.

DETAILED DESCRIPTION OF THE EMBODIMENTS

Figure 1:
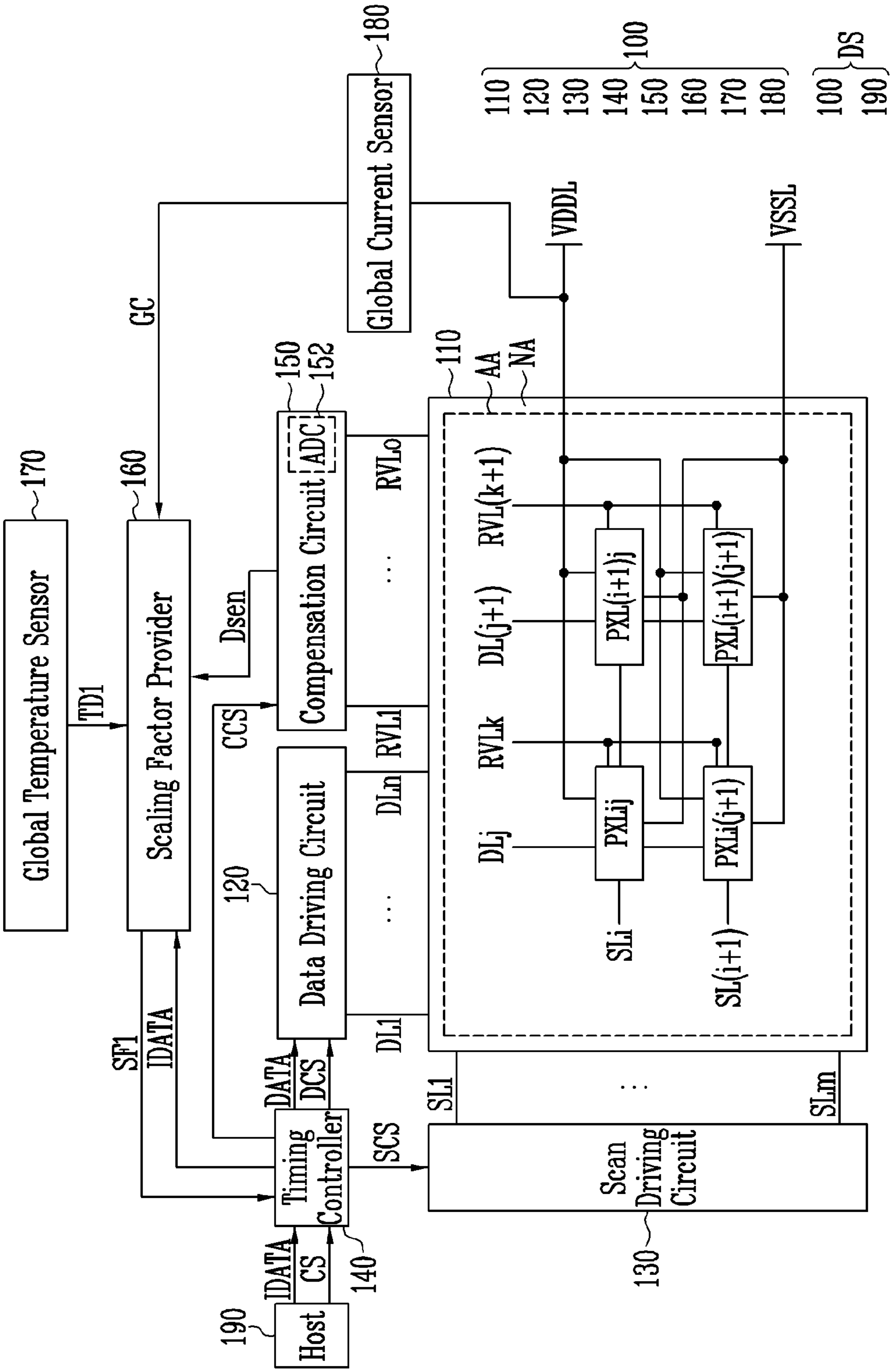
FIG. 1 illustrates a system block diagram of a display system according to an embodiment of the present disclosure.

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

In order to clearly describe the present disclosure, parts or portions that are irrelevant to the description are omitted, and identical or similar constituent elements throughout the specification are denoted by the same reference numerals. Therefore, the above-mentioned reference numerals may be used in other drawings.

While the size and thickness of each element are illustrated in the drawings to represent certain embodiments, the present disclosure is not necessarily limited thereto.

In addition, the expression "equal to or the same as" in the description may mean "substantially equal to or the same as". That is, it may be the same enough to convince those skilled in the art to be the same. Even other expressions may be expressions from which "substantially" is omitted.

Terms such as first, second, and the like will be used only to describe various constituent elements, and are not to be interpreted as limiting these constituent elements. The terms are only used to differentiate one constituent element from other constituent elements. For example, a first constituent element could be termed a second constituent element, and similarly, a second constituent element could be termed as a first constituent element, without departing from the scope of the present disclosure. Singular forms are intended to include plural forms unless the context clearly indicates otherwise.

FIG. 1 illustrates a system block diagram of a display system DS according to an embodiment of the present disclosure.

Referring to FIG. 1, the display system DS according to the embodiment of the present disclosure includes a display device 100 and a host 190. The display device 100 includes a display panel 110, a data driving circuit 120, a scan driving circuit 130, a timing controller 140 (e.g., a control circuit), a compensation circuit 150, a scaling factor provider 160 (e.g., a logic circuit), a global temperature sensor 170, and a global current sensor 180.

A plurality of pixels PXL, a plurality of data lines DL1 to DLn (n is an integer of 2 or more), a plurality of scan lines SL1 to SLm (m is an integer of 2 or more), and a plurality of reference voltage lines RVL1 to RVLo (o is an integer of 2 or more) may be disposed in the display panel 110. The plurality of data lines DL1 to DLn may extend in the display panel 110 in a first direction (for example, a column direction) and may be disposed. The plurality of scan lines SL1 to SLm may extend in the display panel 110 in a second direction (for example, a row direction) and may be disposed. The plurality of reference voltage lines RVL1 to RVLo may extend in the display panel 110 in the first direction (for example, the column direction) and may be disposed.

The plurality of pixels PXL may include a light emitting element. The light emitting element may include, for example, an organic light emitting layer, an inorganic light emitting layer, a quantum dot, and the like.

One pixel PXLij of the plurality of pixels PXL may be electrically connected to an i-th scan line SLi (i is an integer greater than or equal to 1 and less than or equal to m) and a j-th data line DLj (j is an integer greater than or equal to 1 and less than or equal to n). Another pixel PXLi (j+1) of the plurality of pixels PXL may be electrically connected to the i-th scan line SLi and a (j+1)-th data line DL (j+1). Another pixel PXL (i+1) j of the plurality of pixels PXL may be electrically connected to an (i+1)-th scan line SL (i+1) and the j-th data line DLj. Another pixel PXL (i+1) (j+1) of the plurality of pixels PXL may be electrically connected to the (i+1)-th scan line SL (i+1) and the (j+1)-th data line DL (j+1).

Referring to FIG. 1, one pixel PXLij of the plurality of pixels PXL may be electrically connected to a k-th reference voltage line RVLK. Another pixel PXL (i+1) j of the plurality of pixels PXL may be electrically connected to a (k+1)-th reference voltage line RVL (k+1). Depending on the embodiment, the number (o) of reference voltage lines disposed to the display panel 110 may be smaller than the number (n) of data lines. According to this, pixels disposed in different columns may be electrically connected to one reference voltage line.

A first power voltage line VDDL and a second power voltage line VSSL may be disposed in the display panel 110. The plurality of pixels PXL may be electrically connected to the first power voltage line VDDL and the second power voltage line VSSL. The plurality of pixels PXL may be supplied with a first power voltage through the first power voltage line VDDL. The plurality of pixels PXL may be supplied with a second power voltage through the second power voltage line VSSL. The first power voltage and the second power voltage may be voltages for driving the plurality of pixels PXL. The first power voltage may be higher than the second power voltage. For example, the first power voltage may be a positive voltage. For example, the second power voltage may be a ground voltage or a negative voltage.

The timing controller 140 may receive first image data IDATA and a control signal CS from the outside (for example, the host 190). In an embodiment, the control signal CS includes a synchronization signal and a clock signal.

The timing controller 140 may generate a scan control signal SCS, a data control signal DCS, and a compensation control signal CCS based on the control signal CS. The timing controller 140 may supply the scan control signal SCS to the scan driving circuit 130. The timing controller 140 may supply the data control signal DCS to the data driving circuit 120. The timing controller 140 may supply the compensation control signal CCS to the compensation circuit 150.

The scan control signal SCS may include a scan start signal, a clock signal, and the like. The scan start signal may be a signal for controlling a timing of a scan signal. The clock signal included in the scan control signal SCS may be used to shift the scan start signal.

The data control signal DCS may include a source start signal and a clock signal. The source start signal may control a sampling starting point of data. The clock signal included in the data control signal DCS may be used to control a sampling operation.

The compensation control signal CCS may include a sampling signal and a holding signal. The sampling signal may control timing of sampling a voltage of the reference voltage line RVL. The holding signal may control timing of supplying the sampled voltage of the reference voltage line RVL to an analog-to-digital converter (ADC) 152. The compensation circuit 150 may include the ADC 152.

The timing controller 140 may scale grayscale values of the first input image data IDATA by using a first scaling factor SF1 received from the scaling factor provider 160. In an embodiment, the first scaling factor SF1 is commonly applied to the plurality of pixels PXL disposed in the display panel 110. The timing controller 140 may scale the grayscale values of the first image data IDATA with the same ratio by reflecting the first scaling factor SF1 to the grayscale values of the first image data IDATA. For example, the timing controller 140 may multiply the grayscale values with the first scaling factor SF1 to perform the scaling.

The timing controller 140 may rearrange the first image data IDATA first image data IDATA in which the grayscale values thereof are scaled to generate second image data DATA, and may supply the generated second image data DATA to the data driving circuit 120.

The data driving circuit 120 may receive the second image data DATA and the data control signal DCS from the timing controller 140, and may supply data signals (or data voltages) corresponding to the second image data DATA to a plurality of data lines DL1 to DLm in response to the received data control signal DCS. The data signals supplied to the plurality of data lines DL1 to DLm may be supplied to the pixels PXL selected by the scan signals.

The scan driving circuit 130 may receive the scan control signal SCS from the timing controller 140, and may supply scan signals to the plurality of scan lines SL1 to SLm based on the received scan control signal SCS. For example, the scan driving circuit 130 may sequentially supply the scan signals to the plurality of scan lines SL1 to SLm. When the scan signals are sequentially supplied, the plurality of pixels PXL may be selected in pixel row units (or horizontal line units), and data signals may be supplied to the selected pixels. To this end, the plurality of pixels PXL may include switching elements (for example, transistors) turned on or off by the received scan signal. The scan signal may have a turn-on voltage level (one of a high level and a low level) or a turn-off voltage level (the other one of the high level and the low level) of a transistor.

The compensation circuit 150 may be configured to sense the plurality of reference voltage lines RVL1 to RVLo. For example, the compensation circuit 150 may sense (or sample) an analog voltage of one of the plurality of reference voltage lines RVL1 to RVLo. The compensation circuit 150 may include an analog-to-digital converter 152 configured to convert the sampled analog voltage into a corresponding digital sensing value Dsen. The compensation circuit 150 may output the digital sensing value Dsen converted by the analog-to-digital converter 152. In an embodiment of the present disclosure, the outputted digital sensing value Dsen is inputted to the scaling factor provider 160. In some embodiments, the outputted digital sensing value Dsen may be inputted to the timing controller 140.

In an embodiment, the digital sensing value Dsen inputted to the scaling factor provider 160 corresponds to a local temperature of the display panel 110.

Each of the plurality of pixels PXL may have a different characteristic value of a light emitting element according to a temperature (for example, a local temperature) of a region in which the corresponding pixel is disposed. For example, in a pixel disposed in a region in which the local temperature is relatively high, the light emitting efficiency of the light emitting element is high, so even if the same voltage is applied to both ends of the light emitting element, an amount of the current flowing through the light emitting element may be large. Conversely, in a pixel disposed in a region in which the local temperature is low, the light emitting efficiency of the light emitting element is low, so even if the same voltage is applied to both ends of the light emitting element, an amount of the current flowing through the light emitting element may be small. A change in the characteristic value of the light emitting element according to temperature may be reflected in the digital sensing value Dsen to be provided to the scaling factor provider 160.

The global temperature sensor 170 is configured to sense an ambient temperature of the display device 100 or the display system DS. The global temperature sensor 170 may generate first temperature data TD1 corresponding to the sensed ambient temperature, and may provide the generated first temperature data TD1 to the scaling factor provider 160.

The global current sensor 180 is configured to sense a current flowing through the display panel 110 or a value corresponding thereto. For example, the global current sensor 180 may be connected to the first power voltage line VDDL. The global current sensor 180 may generate a global current value GC by sensing a current flowing in the first power voltage line VDDL. The global current value GC may correspond to a sum of currents commonly supplied to the plurality of pixels PXL through the first power voltage line VDDL. The global current sensor 180 may provide the generated global current value GC to the scaling factor provider 160. In some embodiments, the global current sensor 180 may be connected to the second power voltage line VSSL to sense a current flowing in the second power voltage line VSSL to generate the global current value GC.

In an embodiment, the scaling factor provider 160 generates the first scaling factor SF1 based on the first image data IDATA, the digital sensing value Dsen, the global current value GC, and the first temperature data TD1.

The scaling factor provider 160 may generate a frame load value based on the first image data IDATA. The frame load value may correspond to grayscale values of an image frame. For example, as a sum of the grayscale values of the image frame increases, the frame load value of the corresponding image frame may increase. For example, the frame load value may be 100 in a full-white image frame, and the frame load value may be 0 in a full-black image frame. The full-white image frame may refer to an image frame in which the grayscale of all pixels PXL disposed in the display panel 110 is set to the maximum and light is emitted with the maximum luminance. The full-black image frame may refer to an image frame in which the grayscale of all pixels PXL disposed in the display panel 110 is set to the minimum and that does not emit light. The frame load value may have a value between 0 and 100.

The scaling factor provider 160 may compare the digital sensing value Dsen and a reference current value with reference to a first lookup table that is previously stored to calculate second temperature data corresponding to a degree to which the digital sensing value increases or decreases from the reference current value. The scaling factor provider 160 may generate third temperature data based on the calculated second temperature data and the inputted first temperature data TD1. The scaling factor provider 160 may generate a first intermediate scaling factor corresponding to the third temperature data with reference to a second lookup table that is previously stored. The scaling factor provider 160 may generate a second intermediate scaling factor SFb corresponding to the third temperature data and the frame load value with reference to a third lookup table that is previously stored. The scaling factor provider 160 may compare the second intermediate scaling factor and the first scaling factor SF1, and may generate the second scaling factor SF2 according to the compared result. The scaling factor provider 160 may calculate a target global current value according to a frame load value with reference to a fourth lookup table that is previously stored. The scaling factor provider 160 may compare the calculated target global current value with the inputted global current value GC, and may maintain, increase, or decrease the second scaling factor SF2 according to the compared result to output it as the first scaling factor SF1. An operation of the above-described scaling factor provider 160 will be described in detail with reference to FIG. 4 to FIG. 11 and application examples.

The host 190 outputs the first image data IDATA and the control signal CS. The host 190 may be connected to the display device 100, an external input/output device (for example, a speaker, a keyboard, and the like), a communicator, and a memory and may be configured to control the display device 100, the external input/output device, the communicator, and the memory. The host 190 may be implemented as, for example, an application processor (AP), a set-top box, or the like.

Each component of the display system DS according to embodiments of the present disclosure is merely a functional division, and two or more components may be mounted on one integrated circuit. For example, the scaling factor provider 160 may be implemented as a functional block within the timing controller 140 or may be implemented with the timing controller 140 in an integrated circuit. For example, the data driving circuit 120 and the compensation circuit 150 may be implemented through one integrated circuit. For example, the data driving circuit 120 and the timing controller 140 may be implemented in one integrated circuit.

Figure 2:
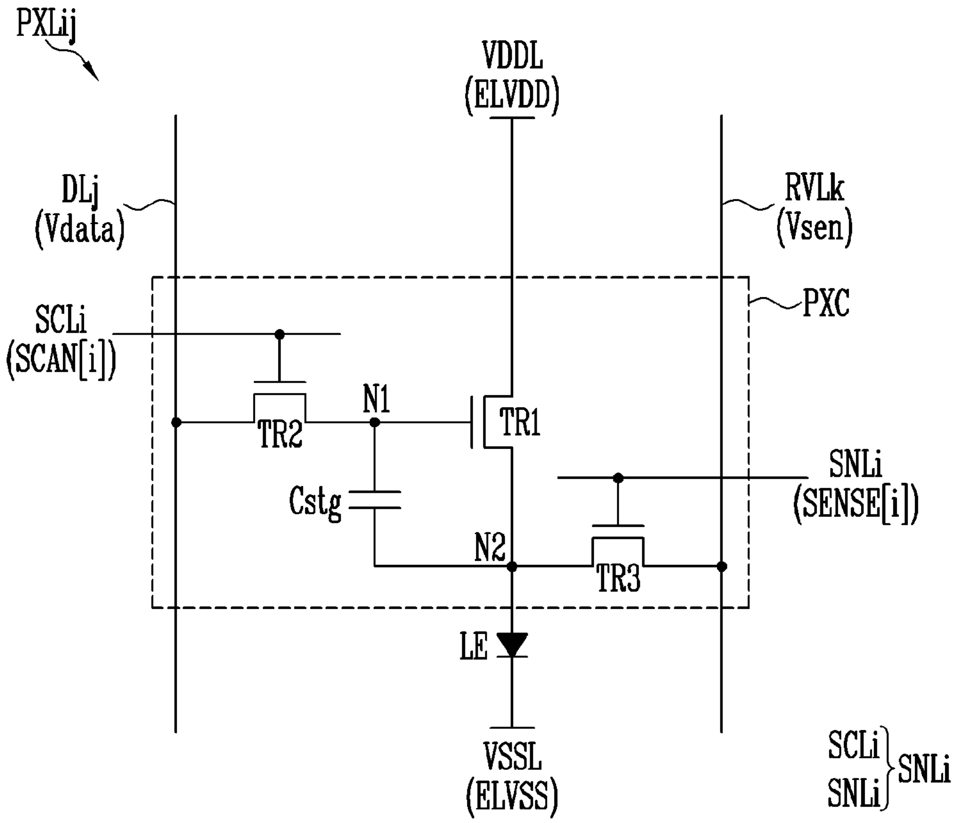
FIG. 2 illustrates a structure of a pixel according to an embodiment of the present disclosure.

FIG. 2 illustrates a structure of a pixel PXLij of the display panel 110 according to an embodiment of the present disclosure.

The pixel PXLij according to embodiments of the present disclosure may include a pixel circuit PXC and a light emitting element LE.

The pixel circuit PXC may include two or more transistors and one or more capacitors. For example, referring to FIG. 2, the pixel PXLij according to embodiments of present disclosure may include a first transistor TR1, a second transistor TR2, a third transistor TR3, and a storage capacitor Cstg.

The first transistor TR1 may be configured to control an amount of a current flowing through the light emitting element LE. The first transistor TR1 may switch an electrical connection between the first power voltage line VDDL and a second node N2. A gate electrode of the first transistor TR1 may be electrically connected to a first node N1. One of source and drain electrodes (for example, a source electrode) of the first transistor TR1 may be electrically connected to the second node N2. The other one of the source and drain electrodes (for example, the drain electrode) of the first transistor TR1 may be electrically connected to the first power voltage line VDDL.

The second transistor TR2 may be configured to switch an electrical connection between the data line DLj and the first node N1. The second transistor TR2 may transmit a data signal Vdata applied to the data line DLj or a voltage corresponding thereto to the first node N1. A gate electrode of the second transistor TR2 may be electrically connected to the first scan line SCLi. An operation timing of the second transistor TR2 may be controlled by a first scan signal SCAN [i]. The first scan signal SCAN [i] may be applied to the first scan line SCLi. The second transistor TR2 may transmit the data signal Vdata to the first node N1 in response to the first scan signal SCAN [i] of a turn-on level. The data signal Vdata transmitted to the first node N1 may be stored in one side electrode (or the first node N1) of the storage capacitor Cstg.

The third transistor TR3 may be configured to switch an electrical connection between the second node N2 and the reference voltage line RVLk. The third transistor TR3 may transmit a voltage applied to the reference voltage line RVLk to the second node N2 or transmit a voltage of the second node N2 to the reference voltage line RVLk. A gate electrode of the third transistor TR3 may be electrically connected to the second scan line SNLi. An operation timing of the third transistor TR3 may be controlled by a second scan signal SENSE [i]. The second scan signal SENSE [i] may be applied to the second scan line SNLi. The third transistor TR3 may transmit the voltage of the second node N2 to the reference voltage line RVLk in response to the second scan signal SENSE [i] of a turn-on level, or may transmit the voltage of the reference voltage line RVLk to the second node N2. When the voltage of the second node N2 is transmitted to the reference voltage line RVLk, an analog sensing voltage Vsen is applied to the reference voltage line RVLk.

The first scan signal SCAN [i] and the second scan signal SENSE [i] may be applied through different scan lines, but in some embodiments, the first scan signal SCAN [i] and the second scan signal SENSE [i] are applied through the same scan line. In this case, the first scan line SCLi and the second scan line SNLi may be the same scan line. The first scan line SCLi and the second scan line SNLi are included in the aforementioned scan line SLi.

The storage capacitor Cstg includes one electrode electrically connected to the first node N1 and another electrode electrically connected to the second node N2. A voltage difference between the first node N1 and the second node N2 may be maintained by the storage capacitor Cstg.

Transistors in the pixel circuit PXC may be N-type transistors, but in some embodiments, one or more transistors may be P-type transistors. For example, the first transistor TR1, the second transistor TR2, and the third transistor TR3 may be N-type transistors, but in some embodiments, at least one of the first transistor TR1, the second transistor TR2, and the third transistor TR3 may be a P-type transistor. The N-type transistor refers to a transistor in which an amount of current that is conducted when a voltage difference between a gate terminal and a source terminal increases in a positive direction increases. The P-type transistor refers to a transistor in which an amount of current that is conducted when a voltage difference between a gate terminal and a source terminal increases in a negative direction increases. A transistor in the pixel circuit PXC may one of various types such as a thin film transistor (TFT), a field effect transistor (FET), and a bipolar junction transistor (BJT).

The transistors configuring the pixel circuit PXC may include an amorphous silicon (a-Si) semiconductor, an oxide semiconductor, a low temperature polycrystalline silicon (LTPS) semiconductor, and the like.

A first electrode (one of anode or cathode electrodes) of the light emitting element LE is electrically connected to the second node N2. A second electrode (the other of the anode and cathode electrodes) of the light emitting element LE is electrically connected to the second power voltage line VSSL. The light emitting element LE may generate light of a luminance (e.g., predetermined luminance) in response to an amount of current (a driving current) supplied from the first transistor TR1.

The light emitting element LE may be implemented by an organic light emitting diode. Alternately, the light emitting element LE may be implemented as an inorganic light emitting diode such as a micro light emitting diode (LED) or a quantum dot light emitting diode. In another embodiment, the light emitting element LE may be an element complexly made of organic and inorganic materials. In FIG. 2, the pixel PXLij is illustrated as including a single light emitting element LE, but in some embodiments, the pixel PXLij may include a plurality of light emitting elements. The plurality of light emitting elements may be connected in series, in parallel, or in series/parallel to each other.

A first power voltage ELVDD is applied to the first power voltage line VDDL. A second power voltage ELVSS is applied to the second power voltage line VSSL. For example, the first power voltage ELVDD may be greater than the second power voltage ELVSS.

In an embodiment, the global current value GC provided by the global current sensor 180 of FIG. 1 is a sum value of driving currents flowing through the plurality of pixels PXL (for example, all pixels PXL) disposed in the display panel 110. Grayscale values are scaled corresponding to the first scaling factor SF1 generated by the scaling factor provider 160 of FIG. 1 to adjust the voltage of the data signal Vdata. Accordingly, the driving current values of the plurality of pixels PXL may be adjusted.

Furthermore, as the driving current values of the plurality of pixels PXL are adjusted, the global current value GC provided by the global current sensor 180 of FIG. 1 to the scaling factor provider 160 is changed. The scaling factor provider 160 may update the first scaling factor SF1 based on the changed global current value GC. The update of the first scaling factor SF1 may be performed in frame units.

Figure 3A:
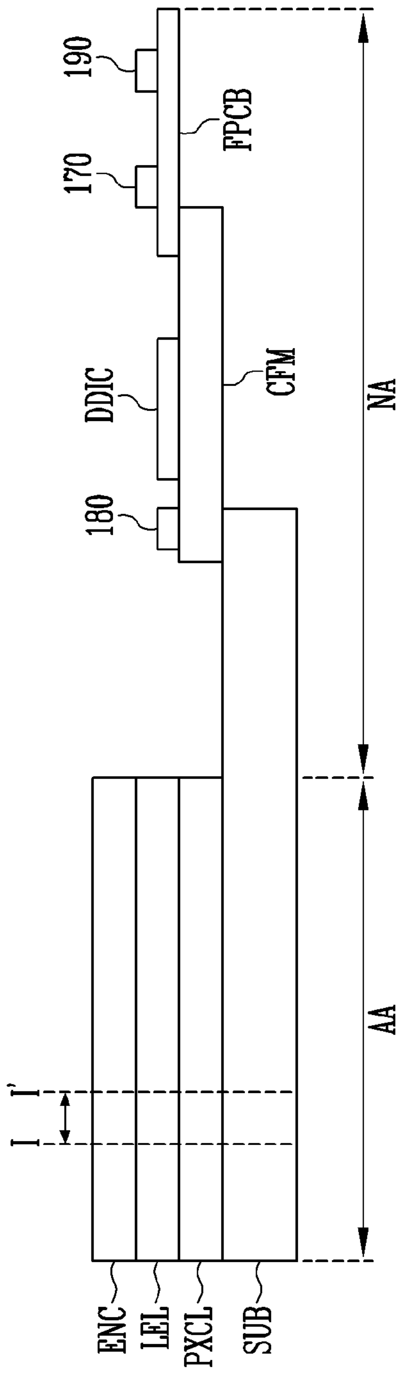
FIG. 3A illustrates an example of a display system.
Figure 3B:
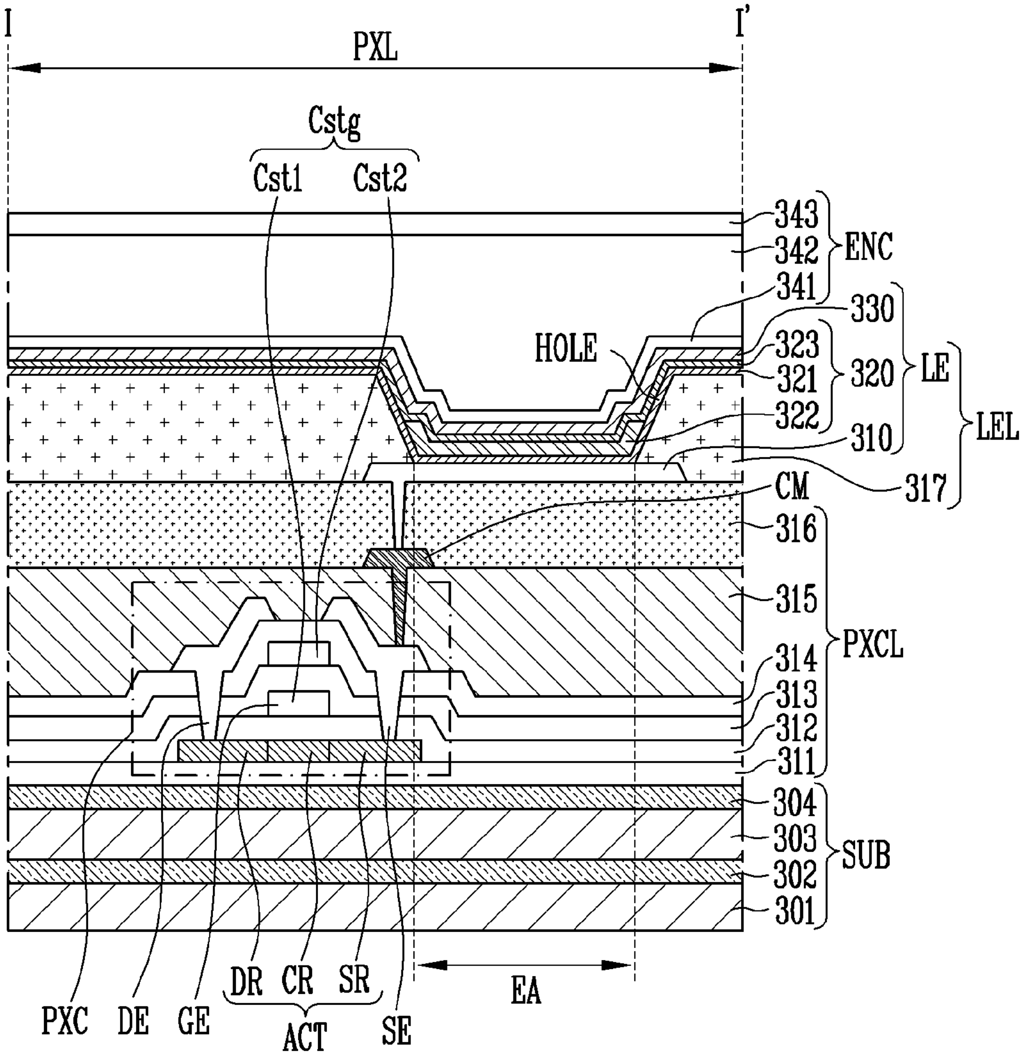
FIG. 3B illustrates a cross-sectional view taken along line I-I' of a display panel of FIG. 3A.

FIG. 3A illustrates an example of the display system DS of FIG. 1. FIG. 3B illustrates a cross-sectional view taken along line I-I' of a display panel of FIG. 3A. The display panel of FIG. 3A and FIG. 3B may correspond to the display panel 110 of FIG. 1.

Referring to FIG. 3A, the display system according to the embodiments of the present disclosure may include a base substrate SUB, a pixel circuit layer PXCL, a light emitting element layer LEL, an encapsulation layer ENC, the global current sensor 180, and a display driving integrated circuit DDIC, a flexible circuit board FPCB, the global temperature sensor 170, the host 190, and the like. Here, the base substrate SUB, the pixel circuit layer PXCL, the light emitting element layer LEL, and the encapsulation layer ENC may be constituent elements of the aforementioned display panel 110 (see FIG. 1).

Hereinafter, the base substrate SUB, the pixel circuit layer PXCL, the light emitting element layer LEL, and the encapsulation layer ENC according to the embodiments of the present disclosure will be described with reference to FIG. 3B.

The base substrate SUB may include a base layer containing a polymer resin and a barrier layer of an inorganic insulating layer. For example, the base substrate SUB may include a first base layer 301, a first barrier layer 302, a second base layer 303, and a second barrier layer 304 sequentially stacked. The first base layer 301 and the second base layer 303 may include polyimide (PI), polyethersulfone (PES), polyarylate, polyetherimide (PEI), polyethylene naphthalate (PEN), polyethylene terephthalate (PET), polyphenylene sulfide (PPS), polycarbonate (PC), cellulose triacetate (CTA), and/or cellulose acetate propionate (CAP). The first barrier layer 302 and the second barrier layer 304 may include an inorganic insulating material such as a silicon oxide, a silicon oxynitride, and/or a silicon nitride. The base substrate SUB may have a flexible characteristic.

The pixel circuit layer PXCL may be disposed on the base substrate SUB. The pixel circuit layer PXCL may include the aforementioned pixel circuit PXC (see FIG. 2). At least one thin film transistor and at least one capacitor may be disposed in the pixel circuit layer PXCL. The pixel circuit layer PXCL may include not only the pixel circuit PXC, but also a buffer layer 311, gate insulating layers 312 and 313, and an interlayer insulating layer 314, and planarization insulating layers 315 and 316 disposed below and/or above respective elements configuring the pixel circuit PXC.

The buffer layer 311 may reduce or block penetration of foreign matter, moisture, or outside air from a lower portion of the base substrate SUB. The buffer layer 311 may provide a flat surface on the base substrate SUB. The buffer layer may include an inorganic insulating material such as a silicon oxide, a silicon oxynitride, or a silicon nitride. The buffer layer 311 may have a single-layer structure or a multi-layer structure including the above-mentioned material.

A thin film transistor may be disposed on the buffer layer 311. The thin film transistor may include a semiconductor layer ACT, a gate electrode GE, a drain electrode DE, and a source electrode SE.

The semiconductor layer ACT may include polycrystalline silicon. The semiconductor layer ACT may include single crystal silicon. The semiconductor layer ACT may include amorphous silicon (a-Si). The semiconductor layer ACT may include an oxide semiconductor. The semiconductor layer ACT may include an organic semiconductor or the like. The semiconductor layer ACT may include a channel region CR, a drain region DR disposed on one side of the channel region CR, and a source region SR disposed on the other side of the channel region CR.

The gate electrode GE may overlap the channel region CR. The gate electrode GE may include a low-resistance metallic material. The gate electrode GE may include a conductive material including molybdenum (Mo), aluminum (Al), copper (Cu), titanium (Ti), and the like. The gate electrode GE may have a multi-layer structure or a single-layer structure including the above materials.

The first gate insulating layer 312 may be disposed between the semiconductor layer ACT and the gate electrode GE. The first gate insulating layer 312 may include an inorganic insulator such as a silicon oxide (SiO2), a silicon nitride (SiNx) (x is a positive number), a silicon oxynitride (SiON), an aluminum oxide (Al2O3), a titanium oxide (TiO2), a tantalum oxide (Ta2O5), a hafnium oxide (HfO2), and/or a zinc oxide (ZnO2).

The second gate insulating layer 313 may cover the gate electrode GE. Similar to the first gate insulating layer 312, the second gate insulating layer 313 may include an inorganic insulator such as a silicon oxide (SiO2), a silicon nitride (SiNx), a silicon oxynitride (SiON), an aluminum oxide (Al2O3), a titanium oxide (TiO2), a tantalum oxide (Ta2O5), a hafnium oxide (HfO2), and/or a zinc oxide (ZnO2).

An upper electrode Cst2 of the storage capacitor Cstg may be disposed on an upper portion of the second gate insulating layer 313. The upper electrode Cst2 may overlap the gate electrode GE below it. The gate electrode GE and the upper electrode Cst2 overlapping each other with the second gate insulating layer 313 interposed therebetween may configure the storage capacitor Cstg. The gate electrode GE may function as a lower electrode Cst1 of the storage capacitor Cstg.

The upper electrode Cst2 may include aluminum (Al), platinum (Pt), palladium (Pd), silver (Ag), magnesium (Mg), gold (Au), nickel (Ni), neodymium (Nd), iridium (Ir), chromium (Cr), calcium (Ca), molybdenum (Mo), titanium (Ti), tungsten (W), and/or copper (Cu). The upper electrode Cst2 may be formed to have a single-layer structure or multi-layer structure of the aforementioned material.

The interlayer insulating layer 314 may cover the upper electrode Cst2. The interlayer insulating layer 314 may include a silicon oxide (SiO2), a silicon nitride (SiNx), a silicon oxynitride (SiON), an aluminum oxide (Al2O3), a titanium oxide (TiO2), a tantalum oxide (Ta2O5), a hafnium oxide (HfO2), and/or a zinc oxide (ZnO2). The interlayer insulating layer 314 may have a single-layer structure or a multi-layer structure including the aforementioned inorganic insulator.

The drain electrode DE and the source electrode SE may be disposed on the interlayer insulating layer 314, respectively. The drain electrode DE and the source electrode SE may be electrically connected to the drain region DR and the source region SR through contact holes formed in insulating layers thereunder, respectively. The drain electrode DE and the source electrode SE may include a material with excellent conductivity. For example, the drain electrode DE and the source electrode SE may include a conductive material including molybdenum (Mo), aluminum (Al), copper (Cu), titanium (Ti), and the like. The drain electrode DE and the source electrode SE may be formed in a multi-layer structure or a single-layer structure including the above material. For example, the drain electrode DE and the source electrode SE may have a multi-layer structure of Ti/Al/Ti.

The first planarization insulating layer 315 may cover the drain electrode DE and the source electrode SE. A contact metal CM may be disposed on the first planarization insulating layer 315. The contact metal CM may include a conductive material including molybdenum (Mo), aluminum (Al), copper (Cu), titanium (Ti), and the like. The contact metal CM may be formed of a multilayer or a single layer including the above material. The second planarization insulating layer 316 may be disposed on the first planarization insulating layer 315. The second planarization insulating layer 316 may cover the contact metal CM. In some embodiments, the contact metal CM may be omitted.

The first planarization insulating layer 315 and the second planarization insulating layer 316 may include a general purpose polymer such as polymethylmethacrylate or polystyrene; a polymer derivative having a phenolic group; and an organic insulator such as an acrylic polymer, an imide polymer, an aryl ether polymer, an amide polymer, a fluorine polymer, a p-xylene polymer, a vinyl alcohol polymer, and a blend thereof.

The light emitting element layer LEL may be disposed on the pixel circuit layer PXCL. The light emitting element LE may be disposed in the light emitting element layer LEL. The light emitting element LE may include, for example, an organic light emitting diode, but the embodiments of the present disclosure are not limited thereto. The light emitting element LE may include a pixel electrode 310, an intermediate layer 320, and a counter electrode 330. The light emitting element LE may emit red, green, or blue light or emit red, green, blue, or white light.

The pixel electrode 310 may be electrically connected to a thin film transistor through contact holes formed in the second planarization insulation layer 316 and the first planarization insulation layer 315. For example, the pixel electrode 310 may be electrically connected to the thin film transistor through the contact metal CM disposed on the first planarization insulating layer 315. The pixel electrode 310 may include a conductive oxide such as an indium tin oxide (ITO), an indium zinc oxide (IZO), a zinc oxide (ZnO), an indium oxide (In2O3), an indium gallium oxide (IGO), and/or an aluminum zinc oxide (AZO). The pixel electrode 310 may include a reflective film including silver (Ag), magnesium (Mg), aluminum (Al), platinum (Pt), palladium (Pd), gold (Au), nickel (Ni), neodymium (Nd), iridium (Ir), chromium (Cr), and/or a compound thereof. In another embodiment, the pixel electrode 310 may further include a film formed of ITO, IZO, ZnO, or In2O3 above and/or below the aforementioned reflective film.

A pixel defining film 317 may be disposed on the pixel electrode 310. The pixel defining film 317 may include a hole HOLE exposing at least a portion of an upper surface of the pixel electrode 310. The pixel defining film 317 may include an organic insulator and/or an inorganic insulator. In the pixel PXL, the hole HOLE may define a light emitting area EA in which light is emitted from the light emitting element LE. For example, a width of the hole HOLE may correspond to that of the light emitting area EA. The pixel defining film 317 may include an organic insulating material. For example, the pixel defining film 317 may include polystyrene, polymethylmethacrylate, polyacrylonitrile, polyamide, polyimide, polyarylether, heterocyclic polymer, parylene, epoxy, benzocyclobutene, a siloxane based resin, and/or a silane based resin.

The intermediate layer 320 may include a light emitting layer 322 formed to correspond to the pixel electrode 310. The light emitting layer 322 may include a polymer or low molecular weight organic light emitting material that emits light of a predetermined color. The light emitting layer 322 may include an inorganic light emitting material or may include a quantum dot.

The intermediate layer 320 may include a first functional layer 321 and a second functional layer 323 respectively disposed below and above the light emitting layer 322. The first functional layer 321 may include, for example, a hole transport layer (HTL), a hole injection layer (HIL), and the like. The second functional layer 323 may include an electron transport layer (ETL), an electron injection layer (EIL), and the like. Like a counter electrode 330 to be described later, the first functional layer 321 and/or the second functional layer 323 may be a common layer integrally formed to entirely cover the base substrate SUB.

The counter electrode 330 is disposed on the pixel electrode 310, and may overlap the pixel electrode 310. The counter electrode 330 may include a conductive material having a low work function. For example, the counter electrode 330 may include a light transmitting layer (for example, a transparent layer or a translucent layer) including silver (Ag), magnesium (Mg), aluminum (Al), platinum (Pt), palladium (Pd), gold (Au), nickel (Ni), neodymium (Nd), iridium (Ir), chromium (Cr), lithium (Li), calcium (Ca), or an alloy thereof. The counter electrode 330 may further include a film formed of ITO, IZO, ZnO, or In2O3 on the light transmitting layer including the above-mentioned material. The counter electrode 330 may be a common layer integrally formed to entirely cover the base substrate SUB.

The encapsulation layer ENC may be further disposed on the light emitting element layer LEL. The encapsulation layer ENC may cover the light emitting element layer LEL. The encapsulation layer ENC may include at least one inorganic encapsulation layer and at least one organic encapsulation layer. For example, the encapsulation layer ENC may include a first inorganic encapsulation layer 341, an organic encapsulation layer 342, and a second inorganic encapsulation layer 343. The first inorganic encapsulation layer 341, the organic encapsulation layer 342, and the second inorganic encapsulation layer 343 may be sequentially stacked.

An area in which the pixel circuit layer PXCL and the light emitting element layer LEL are disposed on the base substrate SUB may correspond to a display area AA. A non-display area NA in which components for supplying a signal (for example, a voltage and the like) to the pixel circuit layer PXCL are disposed is disposed around the display area AA. At least some of components (for example, the base substrate SUB, the circuit film CFM, the flexible circuit board FPCB, and the like) disposed in the non-display area NA may be bent to be disposed in a rear direction of the display area AA.

The display driving integrated circuit DDIC may include one or more of the aforementioned data driving circuit 120, timing controller 140, compensation circuit 150, and scaling factor provider 160. Hereinafter, an embodiment in which the display driving integrated circuit DDIC includes all of the data driving circuit 120, the timing controller 140, the compensation circuit 150, and the scaling factor provider 160 will be described as an example, but in some embodiments, the components may be divided and disposed in two or more integrated circuits.

Referring to FIG. 3A, an embodiment in which the circuit film CFM is attached in the non-display area NA of the base substrate SUB and the display driving integrated circuit DDIC is disposed on the circuit film CFM is illustrated. The display driving integrated circuit DDIC may be disposed in a chip-on-film (COF) type as illustrated. However, in some embodiments, the display driving integrated circuit DDIC may be disposed in a chip-on-glass (COG) or chip-on-plastic (COP) type that is directly disposed on the base substrate SUB. In this case, the circuit film CFM may be omitted. Hereinafter, an embodiment in which the display driving integrated circuit DDIC is disposed in a chip-on-film type will be described as an example, but the embodiments of the present disclosure are not limited thereto.

Referring to FIG. 3A, the global current sensor 180 may be disposed on the circuit film CFM. However, the global current sensor 180 may be directly disposed on the base substrate SUB. For example, in an embodiment in which the circuit film CFM is omitted, the global current sensor 180 may be disposed on the base substrate SUB (for example, be directly disposed on the base substrate SUB).

The host 190 may be positioned on the flexible circuit board FPCB. Referring to FIG. 1 described above, the first image data IDATA, the control signal CS, and the like inputted to the display driving integrated circuit DDIC may be transmitted through the flexible circuit board FPCB.

The global temperature sensor 170 may be disposed on the flexible circuit board FPCB. The ambient temperature sensed by the global temperature sensor 170 (for example, the ambient temperature of the display system) may be transmitted to the display driving integrated circuit DDIC through the flexible circuit board FPCB. In some embodiments, the global temperature sensor 170 may be integrated into the host 190 to be integrally formed with the host 190.

Figure 4:
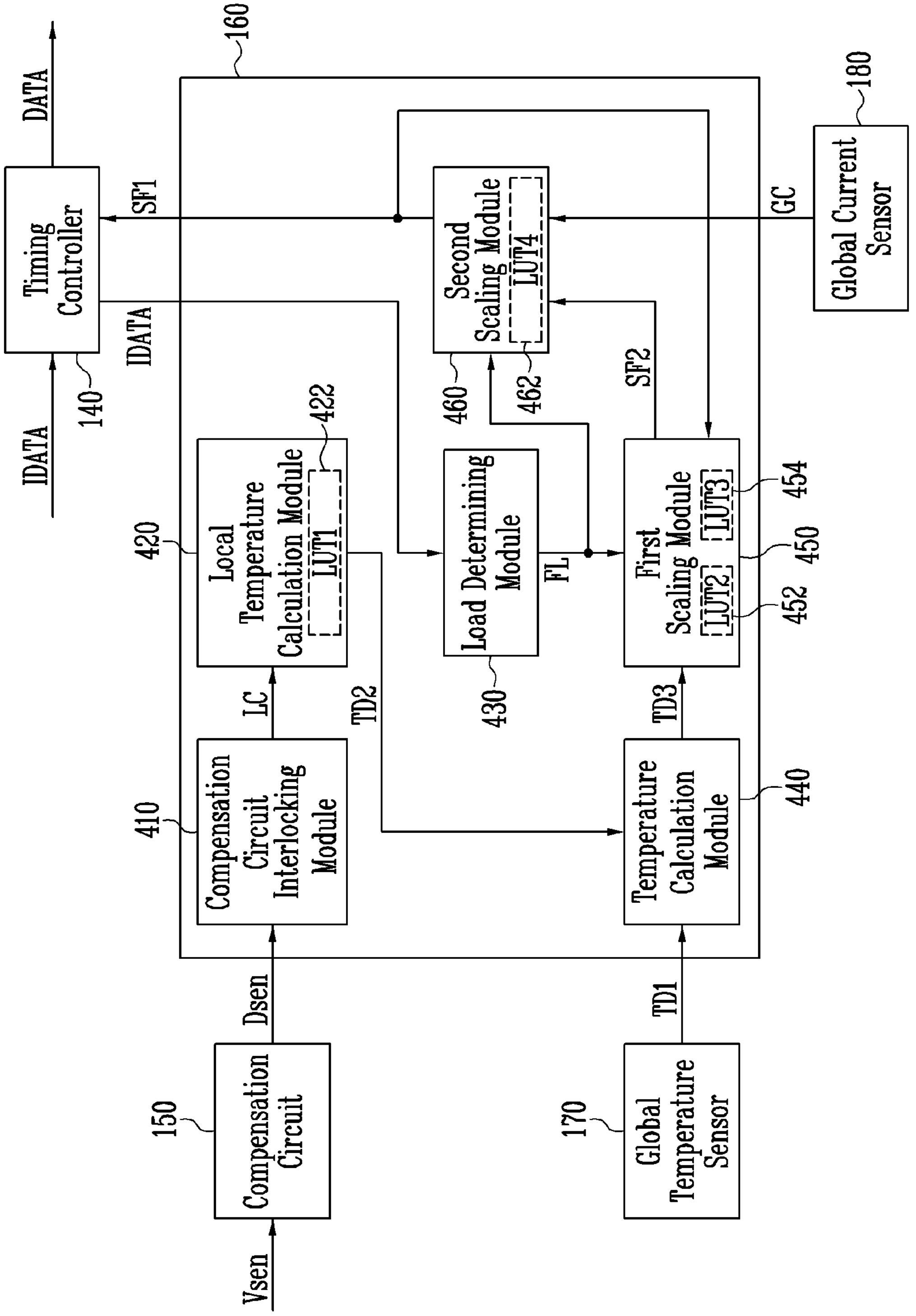
FIG. 4 illustrates a scaling factor provider in more detail, according to an embodiment of the present disclosure.

FIG. 4 illustrates the scaling factor provider 160 in more detail, according to an embodiment of the present disclosure.

Referring to FIG. 4, the scaling factor provider 160 receives the digital sensing value Dsen, the first temperature data TD1, the global current value GC, and the first image data IDATA.

The digital sensing value Dsen may be outputted from the compensation circuit 150. The first temperature data TD1 may be outputted from the global temperature sensor 170. The global current value GC may be outputted from the global current sensor 180. The first image data IDATA may be outputted from the timing controller 140.

In an embodiment, the scaling factor provider 160 includes a compensation circuit interlocking module 410 (e.g., a compensation circuit), a local temperature calculation module 420 (e.g., a first logic circuit), a load determining module 430 (e.g., a second logic circuit), a temperature calculation module 440 (e.g., a third logic circuit), a first scaling module 450 (e.g., a first scaling circuit) and a second scaling module 460 (e.g., a second scaling circuit).

The compensation circuit interlocking module 410 may receive the digital sensing value Dsen, and may output a local current value LC corresponding to the digital sensing value Dsen. The compensation circuit interlocking module 410 may determine the local current value LC from the digital sensing value Dsen. The local current value LC outputted from the compensation circuit interlocking module 410 may be used to detect the local temperature indicating the ambient temperature of an area in which a pixel in which the analog sensing voltage Vsen is sensed is disposed. For example, the compensation circuit interlocking module 410 may controlled by the aforementioned host 190 (see FIG. 1) to convert and output a digital sensing value Dsen inputted in a period provided for sensing a local temperature into a corresponding local current value LC.

The local temperature calculation module 420 may refer to a first lookup table LUT1 to output second temperature data TD2 corresponding to the local current value LC. Referring to FIG. 4, the local temperature calculation module 420 refers to the first look-up table LUT1 stored in a memory 422 (for example, a buffer memory 422) to calculate or read the second temperature data TD2 corresponding to the inputted local current value LC.

The first lookup table LUT1 may include, for example, information of the local current value LC according to the local temperature. For example, in the first lookup table LUT1, when a difference between the inputted local current value LC and the reference current value (e.g., pre-stored reference current value) is 0, information that the local temperature corresponds to room temperature (for example, 25° C.) may be included. For example, in the first lookup table LUT1, when the difference between the inputted local current value LC and the pre-stored reference current value is ΔH, the corresponding difference between the local temperature and the room temperature may include information that is ΔT. The local temperature calculation module 420 may refer to the first lookup table LUT1 to calculate or read the second temperature data TD2 corresponding to the local current value LC. For example, the first lookup table LUT1 may include several entries, where each entry includes a current value difference or a range of current value differences and a corresponding local temperature.

The load determining module 430 may receive the first image data IDATA, and may generate a load value FL corresponding to the first image data IDATA. For example, the load determining module 430 may determine the load value FL from the first image data IDATA. As described with reference to FIG. 1, when the first image data IDATA corresponds to a full-white image frame, the load value FL generated by the load determining module 430 may correspond to 100. When the first image data IDATA corresponds to a full-black image frame, the load value FL generated by the load determining module 430 may correspond to 0. The load determining module 430 may generate and output the frame load value FL between 0 and 100 based on the first image data IDATA.

The temperature calculation module 440 may receive the first temperature data TD1 and the second temperature data TD2, and may generate third temperature data TD3 based on the inputted first temperature data TD1 and second temperature data TD2. For example, the temperature calculation module 440 may receive the first temperature data TD1 corresponding to the global temperature and the second temperature data TD2 corresponding to the local temperature, and may generate the third temperature data TD3 by respectively reflecting the first temperature data TD1 and the second temperature data TD2 at a predetermined ratio. A value of the third temperature data TD3 calculated by the temperature calculation module 440 may be a value between the first temperature data TD1 and the second temperature data TD2. A ratio at which the first temperature data TD1 and the second temperature data TD2 are reflected in the third temperature data TD3 may be variable. For example, when it is determined that first temperature data TD1 is excessively higher than a value corresponding to room temperature, the temperature calculation module 440 may set the reflection ratio of the first temperature data TD1 high. For the same purpose, when it is determined that the second temperature data TD2 is excessively higher than the value corresponding to the room temperature, the reflection ratio of the second temperature data TD2 may be set high. For example, temperature data excessively higher than a value corresponding to room temperature may be weighted more than temperature data near or at room temperature.

The first scaling module 450 may receive the frame load value FL, the third temperature data TD3, and the first scaling factor SF1, and may generate a second scaling factor SF2 with reference to the second lookup table LUT2 and the third lookup table LUT3. The second lookup table LUT2 may be stored in a memory 452 (for example, a buffer memory 452), and the third lookup table LUT3 may be stored in a memory 454 (for example, a buffer memory 454). An operation of the first scaling module 450 will be described with reference to FIG. 6 to FIG. 8.

The second scaling module 460 may receive the frame load value FL, the second scaling factor SF2, and the global current value GC, and may generate or update the first scaling factor SF1 with reference to a fourth lookup table LUT4. The fourth lookup table LUT4 may be stored in a memory 462 (for example, a buffer memory 462). An operation of the second scaling module 460 will be described with reference to FIG. 5.

The timing controller 140 scales the first image data IDATA by using the first scaling factor SF1, and outputs second image data DATA obtained by scaling the first image data IDATA.

Figure 5:
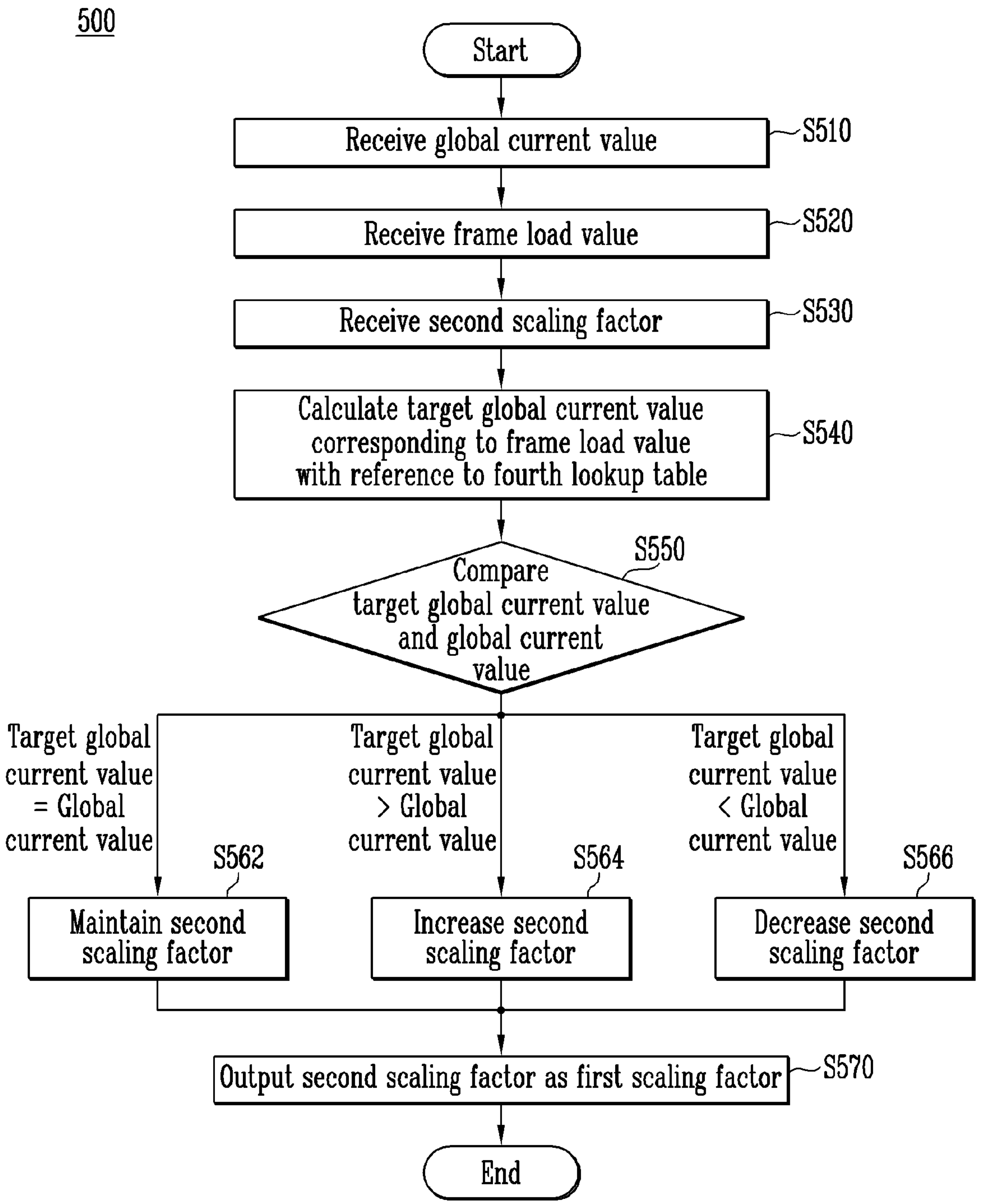
FIG. 5 illustrates a flowchart of a driving method of a second scaling module according to an embodiment of the present disclosure.

FIG. 5 illustrates a flowchart of a driving method 500 of the second scaling module 460 (see FIG. 4) according to an embodiment of the present disclosure.

The driving method 500 of the second scaling module 460 includes receiving a global current value (S510), receiving a frame load value (S520), receiving a second scaling factor SF2 (S530), calculating a target global current value (S540), and comparing the target global current value and the global current value to generate a comparison result (S550). According to the comparison result, one of maintaining the second scaling factor SF2 (S562), increasing the second scaling factor SF2 (S564), and decreasing the second scaling factor SF2 (S566) is performed. The driving method 500 of the second scaling module 460 includes outputting the second scaling factor SF2 as the first scaling factor SF1 (S570).

In the receiving of the global current value (S510), the global current value GC outputted from the global current sensor 180 may be received.

In the receiving of the frame load value (S520), the frame load value FL outputted from the load determining module 430 may be received.

In the receiving of the second scaling factor SF2 (S530), the second scaling factor SF2 outputted from the first scaling module 450 may be received.

In the calculating of the target global current value (S540), the target global current value corresponding to the frame load value may be calculated with reference to the fourth lookup table LUT4. An example of the fourth lookup table LUT4 is shown in FIG. 11. The lookup table LUT4 shown in FIG. 11 represents a relationship between the frame load value FL and the target global current value (Target GC) corresponding thereto.

In the comparing of the target global current value and the global current value (S550), the received global current value and the calculated target global current value may be compared with each other.

As a result of comparing the global current value and the target global current value, when the target global current value and the global current value are equal to each other (or within an error range), the maintaining of the second scaling factor SF2 (S562) may be performed.

As a result of comparing the global current value and the target global current value, when the target global current value is greater than the global current value, the increasing of the second scaling factor SF2 (S564) may be performed. The second scaling factor SF2 may increase by a predetermined ratio or a predetermined value. For example, when the second scaling factor SF2 has a value between 0 and 1, the second scaling factor SF2 may increase by 0.1% (or 0.001) unit. For example, when the target global current value is greater than the global current value and the second scaling factor SF2 is 0.701, the second scaling factor SF2 may be increased to 0.702 in the increasing of the second scaling factor SF2 (S564).

As a result of comparing the global current value and the target global current value, when the target global current value is smaller than the global current value, the decreasing of the second scaling factor SF2 (S566) may be performed. The second scaling factor SF2 may decrease by a predetermined ratio or a predetermined value. For example, when the second scaling factor SF2 has a value between 0 and 1, the second scaling factor SF2 may decrease by 0.1% (or 0.001) unit. For example, when the target global current value is smaller than the global current value and the second scaling factor SF2 is 0.701, the second scaling factor SF2 may be decreased to 0.700 in the decreasing of the second scaling factor SF2 (S566).

Through this, the global current value may finally converge to the target global current value.

In the outputting of the second scaling factor SF2 as the first scaling factor (S570), the second scaling factor SF2 maintained, increased, or decreased according to the comparison result may be outputted as the first scaling factor SF1.

Through this, the second scaling module 460 may generate or update the first scaling factor SF1.

Figure 6:
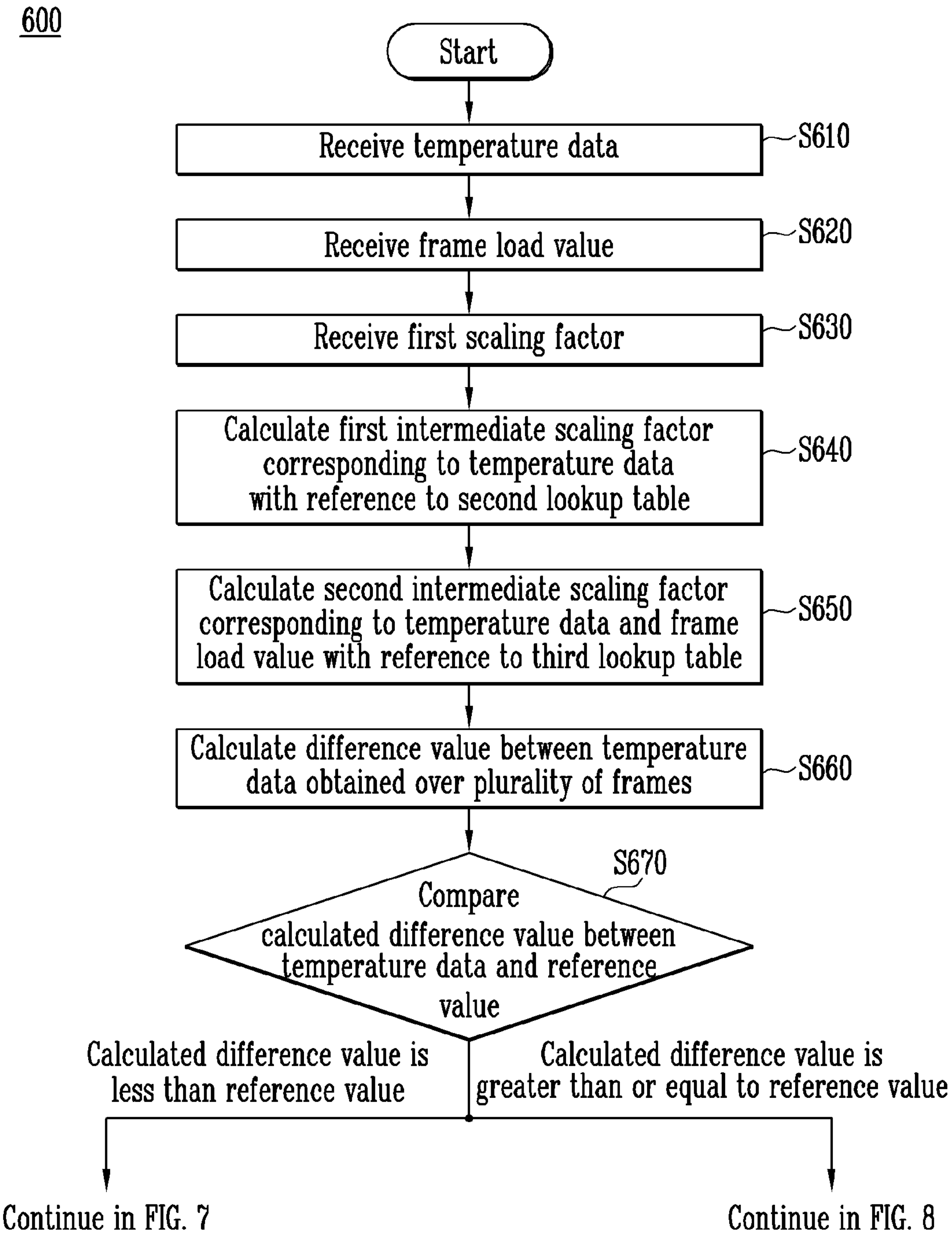
FIG. 6 to FIG. 8 illustrate flowcharts of a driving method of a first scaling module according to embodiments of the present disclosure.
Figure 7:
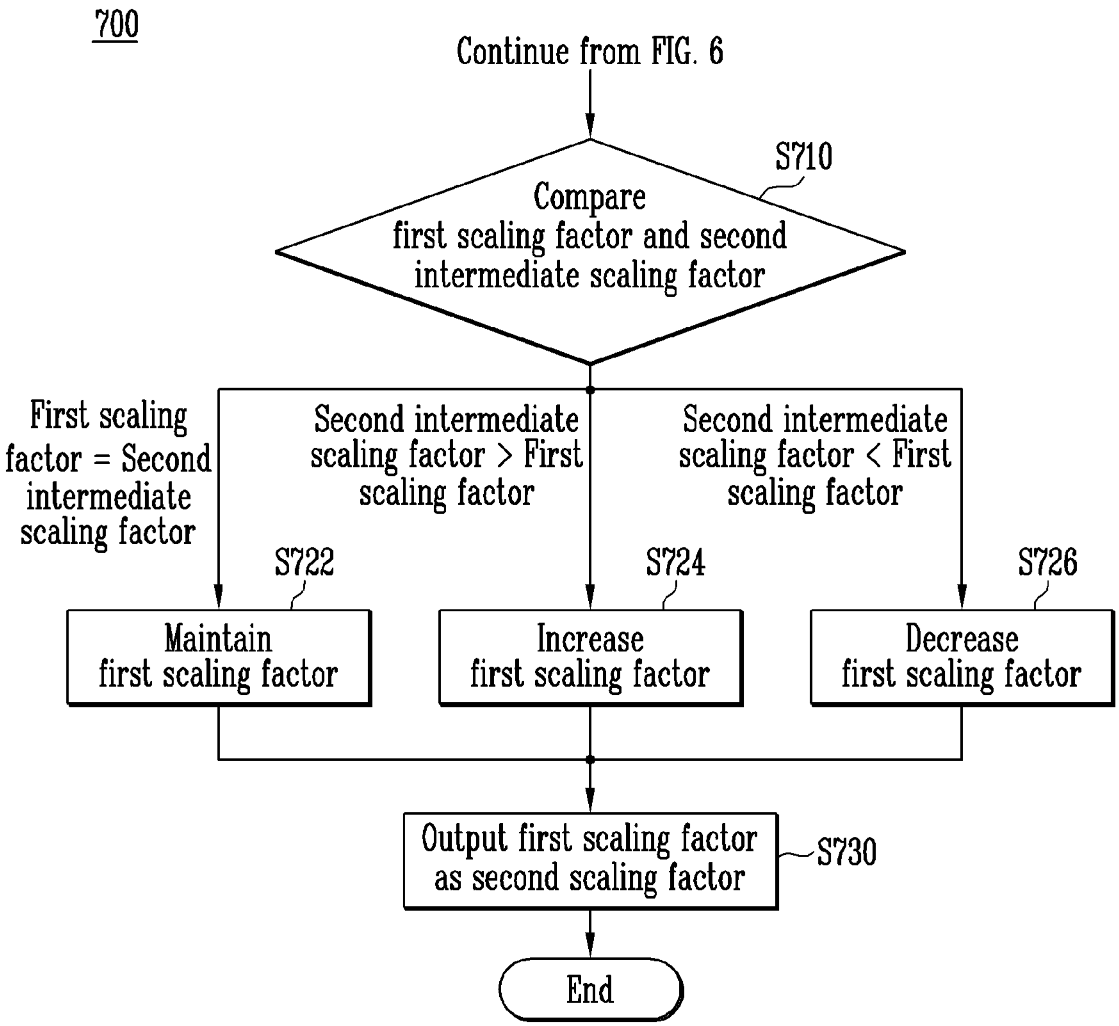
Figure 8:
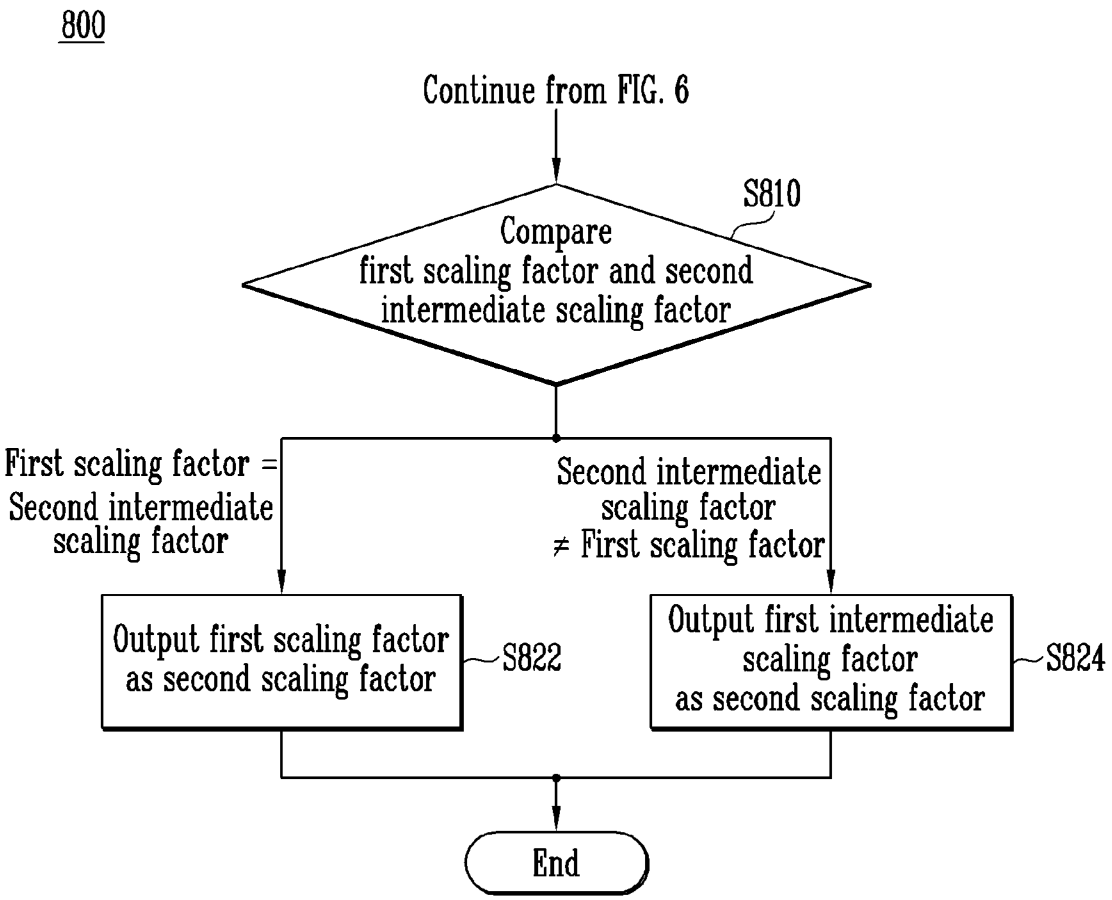

FIG. 6 to FIG. 8 illustrate flowcharts of driving methods 600, 700, and 800 of a first scaling module 450 (see FIG. 4) according to embodiments of the present disclosure.

Referring to FIG. 6, the driving method 600 of the first scaling module 450 may include receiving temperature data (S610), receiving a frame load value FL (S620), receiving a first scaling factor (S630), calculating a first intermediate scaling factor (S640), calculating a second intermediate scaling factor (S650), calculating a difference value between temperature data obtained by using a plurality of frames (S660), and comparing a difference value between the calculated temperature data and a reference value (S670).

In the receiving of the temperature data (S610), the third temperature data TD3 outputted from the above-described temperature calculation module (e.g., 440) may be received.

In the receiving of the frame load value (S620), the frame load value FL outputted from the above-described load determining module (e.g., 430) may be received.

In the receiving of the first scaling factor (S630), the first scaling factor SF1 outputted from the above-described second scaling factor SF2 may be received.

In the calculating of the first intermediate scaling factor (S640), the first intermediate scaling factor corresponding to the temperature data may be calculated with reference to the second lookup table LUT2. An example of the second lookup table LUT2 is shown in FIG. 9. The second lookup table LUT2 shown in FIG. 9 represents a relationship between temperature data (Temp) and a first intermediate scaling factor (SFa). While FIG. 9 illustrates a different intermediate scaling factor every five degrees between 25 and 60 degrees Celsius, embodiments of the disclosure are not limited thereto. For example, a different intermediate scaling factor may be present every one degree, every two degrees, etc.

In the calculating of the second intermediate scaling factor (S650), the second intermediate scaling factor corresponding to the temperature data and the frame load value may be calculated with reference to the third lookup table LUT3. An example of the third lookup table LUT3 is shown in FIG. 10. The third lookup table LUT3 shown in FIG. 10 represents a relationship between temperature data (Temp) and a second intermediate scaling factor (SFb) according to the frame load value (FL). While FIG. 10 illustrates a different intermediate scaling factor for each of the temperatures listed in FIG. 9 for each of six different frame load values, embodiments of the disclosure are not limited thereto. For example, a different intermediate scaling factor may be present for more or less than six different frame load values.

In the calculating of the difference value between the temperature data obtained over the plurality of frames (S660), a difference value between two or more temperature data may be calculated. For example, in the corresponding step, a difference value between two consecutive temperature data may be calculated. For example, in the corresponding step, a difference value between temperature data received in an N-th frame (N is an integer greater than or equal to 1) and temperature data received in an (N+1)-th frame may be calculated. For example, when the N-th received temperature data is 25° C. and the (N+1)-th received temperature data is 30° C., the difference value calculated in the corresponding step may be 5° C. For example, when the N-th received temperature data is 30° C. and the (N+1)-th received temperature data is 25° C., the difference value calculated in the corresponding step may be 5° C. The difference value calculated in the corresponding step may be an absolute value of a difference between temperature data.

In the comparing of the difference value between the calculated temperature data and the reference value (S670), the calculated difference value and the reference value may be compared. The difference value may be a difference value calculated in the calculating of the difference value between the temperature data previously obtained over the plurality of frames (S660). The reference value may be a preset and stored value. For example, the reference value may be a difference between temperatures in the second lookup table LUT2 (see FIG. 4). For example, further referring to FIG. 9 showing the second lookup table LUT2 as an example, the reference value may be set to 5° C., which is a difference between temperatures in the second lookup table LUT2.

Depending on a difference between the calculated difference value and the reference value, different steps may be performed.

Referring to FIG. 7, when the calculated difference value is less (or smaller) than the reference value, the operation method 700 of the second scaling module includes comparing the first scaling factor and the second intermediate scaling factor SFb (S710). According to the comparison result, one of maintaining the first scaling factor (S722), increasing the first scaling factor (S724), and decreasing the first scaling factor (S726) is performed. The operation method 700 of the second scaling module includes outputting the maintained, increased, or decreased first scaling factor as the second scaling factor SF2 (S730).

In the comparing of the first scaling factor and the second intermediate scaling factor SFb (S710), the second intermediate scaling factor SFb calculated in the calculating of the second intermediate scaling factor SFb (S650) is compared with the received first scaling factor.

As a result of comparing the first scaling factor SF1 and the second intermediate scaling factor SFb, when the first scaling factor SF1 and the second intermediate scaling factor SFb are the same, the maintaining of the first scaling factor (S722) is performed.

As a result of comparing the first scaling factor and the second intermediate scaling factor, when the second intermediate scaling factor SFb is greater than the first scaling factor SF1, the increasing of the first scaling factor SF1 (S724) is performed. The first scaling factor SF1 may increase by a predetermined ratio or a predetermined value. For example, when the first scaling factor SF1 has a value between 0 and 1, the first scaling factor may increase by 0.1% (or 0.001) unit. For example, when the second intermediate scaling factor SFb is greater than the first scaling factor SF1 and the first scaling factor SF1 is 0.700, the first scaling factor SF1 may be increased to 0.701 in the increasing of the first scaling factor SF1 (S724).

As a result of comparing the first scaling factor and the second intermediate scaling factor, when the second intermediate scaling factor SFb is smaller than the first scaling factor SF1, the decreasing of the first scaling factor SF1 (S726) is performed. The first scaling factor SF1 may decrease by a predetermined ratio or a predetermined value. For example, when the first scaling factor SF1 has a value between 0 and 1, the first scaling factor SF1 may decrease by 0.1% (or 0.001) unit. For example, when the second intermediate scaling factor SFb is smaller than the first scaling factor and the first scaling factor SF1 is 0.702, the first scaling factor SF1 may be increased to 0.701 in the increasing of the first scaling factor SF1 (S724).

Through this, the first scaling factor SF1 converges to the second intermediate scaling factor SFb. The second intermediate scaling factor SFb is a value that is set based on the temperature data and the frame load value. Since the first scaling factor SF1 is set based on the temperature data and the frame load value, it may be determined by comprehensively reflecting the ambient temperature of the display system, the local temperature of the display panel, the frame load value, and the like.

In the outputting of the first scaling factor SF1 as the second scaling factor SF2 (S730), the first scaling factor SF1 maintained, increased, or decreased according to the comparison result of the previously comparing of the first scaling factor SF1 and the second intermediate scaling factor SFb (S710) may be outputted as the second scaling factor SFb.

Referring to FIG. 8, when the calculated difference value is greater than or equal to the reference value, the operation method 800 of the second scaling module includes comparing the first scaling factor and the second intermediate scaling factor SFb (S810). According to the comparison result, one of outputting the first scaling factor SF1 as the second scaling factor SF2 (S822) and outputting the first intermediate scaling factor as the second scaling factor SF2 (S824) is performed.

In the comparing of the first scaling factor SF1 and the second intermediate scaling factor SFb (S810), the second intermediate scaling factor SFb calculated in the calculating of the second intermediate scaling factor SFb (S650) may be compared with the received first scaling factor SF1.

As a result of comparing the first scaling factor SF1 and the second intermediate scaling factor SFb, when the first scaling factor SF1 and the second intermediate scaling factor SFb are the same, the outputting of the first scaling factor SF1 as the second intermediate scaling factor SFb (S822) is performed.

As a result of comparing the first scaling factor SF1 and the second intermediate scaling factor SFb, when the first scaling factor SF1 and the second intermediate scaling factor SFb are different, the outputting of the first intermediate scaling factor SFa as the second scaling factor SF2 (S824) is performed. Such a step may be performed when the temperature data (for example, the third temperature data TD3 described above in FIG. 4) is rapidly changed.

FIG. 9 illustrates an example of the second lookup table LUT2 according to an embodiment of the present disclosure. FIG. 10 illustrates an example of the third lookup table LUT3 according to an embodiment of the present disclosure. FIG. 11 illustrates an example of the fourth lookup table LUT4 according to an embodiment of the present disclosure.

FIG. 9 shows a relationship between the temperature (Temp) and the first intermediate scaling factor (SFa). FIG. 10 shows a relationship between the temperature (Temp) and the second intermediate scaling factor (SFb) according to the frame load value (FL). FIG. 11 shows a relationship between the frame load value (FL) and the target global current value (Target GC). The temperature (Temp) of FIG. 9 and FIG. 10 may correspond to the aforementioned third temperature data TD3 of FIG. 4.

Hereinafter, with reference to FIG. 1 to FIG. 11 as a whole, a process in which the display system DS is controlled in a condition (for example, an environment in which the temperature (Temp) rises from 25° C. to 50° C.) in which the ambient temperature and/or local temperature of the display system DS according to the embodiments of the present disclosure rise to a high temperature will be described as an example.

(1) Initial State

It is assumed that the initial state is a state in which the temperature (Temp) is 25° C. and the frame load value (FL) is 0%. The first scaling factor SF1 converges to the value of the second intermediate scaling factor (SFb), and referring to FIG. 10, the corresponding second intermediate scaling factor (SFb) is 1.00. Since the first scaling factor SF1 is 1.00 or converges to 1.00, the first scaling factor SF1 is 1.00 in the initial state.

The first scaling module 450 receives the third temperature data TD3, the frame load value FL, and the first scaling factor SF1 (see S610 to S630). The first scaling module 450 calculates the first intermediate scaling factor SFa corresponding to the third temperature data TD3 with reference to the second lookup table LUT2 (see S640). Referring to FIG. 9, the first intermediate scaling factor SFa is 1.00.

The first scaling module 450 calculates the second intermediate scaling factor SFb corresponding to the third temperature data TD3 and the frame load value FL with reference to the third lookup table LUT3 (see S650). Referring to FIG. 10, the calculated second intermediate scaling factor SFb is 1.00.

The first scaling module 450 calculates the difference value between the temperature data TD3 received over the plurality of frames in the initial state (see S660). The temperature data TD3 received in the initial state is constant at 25° C. The first scaling module 450 calculates the difference value between the temperature data TD3 (see S670), and the calculated difference value is 0 (or substantially 0). Based on the second lookup table LUT2, the predetermined reference value is 5° C., and the difference value is less than the reference value. Accordingly, the flowchart turns to FIG. 7.

Referring to FIG. 7, the first scaling module 450 compares the first scaling factor SF1 and the second intermediate scaling factor SFb (see S710). As a result of the comparison, the first scaling factor SF1 and the second intermediate scaling factor SFb are equal to 1.00. Accordingly, the first scaling factor SF1 is maintained (see S722).

The second scaling module 460 receives the global current value GC, the frame load value FL, and the second scaling factor SF2 (see S510 to S530). Since the frame load value FL is 0, the global current value GC is also 0.

The second scaling module 460 calculates the target global current value (Target GC) corresponding to the frame load value FL with reference to the fourth lookup table LUT4 (see S540). Since the frame load value FL is 0, the target global current value (Target GC) is also 0.

The second scaling module 460 compares the target global current value (Target GC) and the global current value GC (see S550). As a result of the comparison, since both the target global current value (Target GC) and the global current value GC are equal to 0, the second scaling factor SF2 is maintained (see S562). The second scaling module 460 outputs 1.00 of the maintained second scaling factor SF2 as the first scaling factor SF1 (see S570).

As described above, it may be shown that the first scaling factor SF1 in the initial state has a value of 1.00.

(2) First Frame Transitioned from Initial State

It is assumed that the first frame transitioned from the initial state has the temperature (Temp) of 50° C. and the frame load value FL is 100. As described above, the first scaling factor SF1 is 1.00, and the global current value GC significantly increases from 0. At 50° C., the global current value GC of the display panel 110 is assumed to be about 21.4 amperes (A).

The first scaling module 450 receives the third temperature data TD3, the frame load value FL, and the first scaling factor SF1 (see S610 to S630). The first scaling module 450 calculates the first intermediate scaling factor SFa corresponding to the third temperature data TD3 with reference to the second lookup table LUT2 (see S640). Referring to FIG. 9, the calculated first intermediate scaling factor SFa is 0.70.

The first scaling module 450 calculates the second intermediate scaling factor SFb corresponding to the third temperature data TD3 and the frame load value FL with reference to the third lookup table LUT3 (see S650). Referring to FIG. 10, the calculated second intermediate scaling factor SFb is 0.70.

The first scaling module 450 calculates the difference value between the temperature data TD3 received over the plurality of frames (see S660). The difference value between the temperature data TD3 received over the plurality of frames is 25° C. The reference value is 5° C., and the difference value is greater than or equal to the reference value. Accordingly, the flowchart turns to FIG. 8.

Referring to FIG. 8, the first scaling module 450 compares the first scaling factor SF1 and the second intermediate scaling factor SFb (see S810). As a result of the comparison, the first scaling factor SF1 and the second intermediate scaling factor SFb are respectively 1.00 and 0.70, so they are different. Accordingly, the first scaling module 450 outputs 0.70, which is the value of the first intermediate scaling factor SFa, as the second scaling factor SF2 (see S824).

The second scaling module 460 receives the global current value GC, the frame load value FL, and the second scaling factor SF2 (see S510 to S530). The global current value GC is about 21.4 amperes (A) as previously assumed.

The second scaling module 460 calculates the target global current value (Target GC) corresponding to the frame load value FL with reference to the fourth lookup table LUT4 (see S540). Since the frame load value FL is 100, the target global current value (Target GC) is 15 amperes (A) as shown in FIG. 11.

The second scaling module 460 compares the target global current value (Target GC) and the global current value GC (see S550). As a result of the comparison, the target global current value (Target GC) is smaller than the global current value GC. The second scaling module 460 decreases the second scaling factor SF2 (see S566). The second scaling factor SF2 may decrease by 0.001 from 0.70 to 0.699. The second scaling module 460 outputs the decreased second scaling factor SF2 value of 0.699 as the first scaling factor SF1 (see S570).

Meanwhile, the timing controller 140 may scale the first input image data IDATA by using the first scaling factor SF1. The timing controller 140 outputs the scaled second image data DATA by using the first scaling factor SF1. The second image data DATA is scaled by the first scaling factor SF1, so that the global current value GC sensed by the global current sensor 180 varies. Specifically, the global current value GC may decrease from the directly previous global current value GC of 21.4 amperes (A) to 14.96 amperes (A) multiplied by the first scaling factor SF1 value of 0.699.

Accordingly, the global current value GC of the display panel 110 is significantly reduced. As a result, a problem in which power consumption in the display panel 110 continues to increase rapidly may be alleviated.

The above effect may be achieved by the first scaling module 450 calculating the first intermediate scaling factor SFa determined only by the temperature (Temp) information regardless of the frame load value FL.

(3) Second Frame Transitioned from Initial State

It is assumed that the second frame transitioned from the initial state is in a state in which the temperature (Temp) and the frame load value FL are maintained. According to this, the temperature (Temp) is 50° C. and the frame load value FL is maintained at 100%. According to the result derived from the transitioned first frame, the first scaling factor SF1 is 0.699 and the global current value GC is 14.96 amperes (A).

The first scaling module 450 receives the third temperature data TD3, the frame load value FL, and the first scaling factor SF1 (see S610 to S630). The first scaling module 450 calculates the first intermediate scaling factor SFa corresponding to the third temperature data TD3 with reference to the second lookup table LUT2 (see S640). Referring to FIG. 9, the calculated first intermediate scaling factor SFa is 0.70.

The first scaling module 450 calculates the second intermediate scaling factor SFb corresponding to the third temperature data TD3 and the frame load value FL with reference to the third lookup table LUT3 (see S650). Referring to FIG. 10, the second intermediate scaling factor SFb is 0.70.

The first scaling module 450 calculates the difference value between the temperature data TD3 received over the plurality of frames (see S660). The difference value between the temperature data TD3 received over the plurality of frames is 0° C. The reference value is 5° C., and the difference value is less than the reference value. Accordingly, the flowchart turns to FIG. 7.

Referring to FIG. 7, the first scaling module 450 compares the first scaling factor SF1 and the second intermediate scaling factor SFb (see S710). As a result of the comparison, the first scaling factor SF1 and the second intermediate scaling factor SFb are 0.699 and 0.70, respectively, and the first scaling factor SF1 is smaller than the second intermediate scaling factor SFb. Accordingly, the first scaling factor SF1 is increased by a predetermined value of 0.001 (see S724). The first scaling factor SF1 is increased to 0.70. The first scaling module 450 outputs 0.70, which is the value of the first scaling factor SF1, as the second scaling factor SF2 (see S730).

The second scaling module 460 receives the global current value GC, the frame load value FL, and the second scaling factor SF2 (see S510 to S530). The global current value GC received by the second scaling module 460 is 14.96 amperes (A), the frame load value FL is 100%, and the second scaling factor SF2 is 0.70.

The second scaling module 460 calculates the target global current value (Target GC) corresponding to the frame load value FL with reference to the fourth lookup table LUT4 (see S540). Since the received frame load value FL is 100%, the target global current value (Target GC) is 15 amperes (A).

The second scaling module 460 compares the target global current value (Target GC) and the global current value GC (see S550). It may vary depending on the resolution, but as a result of the comparison, the target global current value (Target GC) is greater than the global current value GC. The second scaling module 460 increases the second scaling factor SF2 (see S564). The second scaling factor SF2 may increases by 0.001 from 0.70 to 0.701. The second scaling module outputs the increased second scaling factor SF2 value of 0.701 as the first scaling factor SF1 (see S570).

Meanwhile, the timing controller 140 may scale the first input image data IDATA by using the first scaling factor SF1. The timing controller 140 outputs the scaled second image data DATA by using the first scaling factor SF1. The second image data DATA is scaled by the first scaling factor SF1, so that the global current value GC sensed by the global current sensor 180 varies. The global current value GC is changed to a value obtained by multiplying 21.4 amperes (A) by 0.701, which is the first scaling factor SF1. Specifically, the global current value GC may increase from 14.96 amperes (A), which is the directly previous global current value GC, to 15.00 amperes (A).

Accordingly, the global current value GC may reach the target global current value (Target GC).

(4) Third Frame Transitioned from Initial State

It is assumed that the third frame transitioned from the initial state is in a state in which the temperature (Temp) and the frame load value FL are maintained. According to this, the temperature (Temp) is 50° C. and the frame load value FL is maintained at 100%. According to the result derived from the transitioned third frame, the first scaling factor SF1 is 0.701 and the global current value GC is 15.00 amperes (A).

The first scaling module 450 receives the third temperature data TD3, the frame load value FL, and the first scaling factor SF1 (see S610 to S630). The first scaling module 450 calculates the first intermediate scaling factor SFa corresponding to the third temperature data TD3 with reference to the second lookup table LUT2 (see S640). Referring to FIG. 9, the calculated first intermediate scaling factor SFa is 0.70.

The first scaling module 450 calculates the second intermediate scaling factor SFb corresponding to the third temperature data TD3 and the frame load value FL with reference to the third lookup table LUT3 (see S650). Referring to FIG. 10, the second intermediate scaling factor SFb is 0.70.

The first scaling module 450 calculates the difference value between the temperature data TD3 received over the plurality of frames (see S660). The difference value between the temperature data TD3 received over the plurality of frames is 0° C. The reference value is 5° C., and the difference value is less than the reference value. Accordingly, the flowchart turns to FIG. 7.

Referring to FIG. 7, the first scaling module 450 compares the first scaling factor SF1 and the second intermediate scaling factor SFb (see S710). As a result of the comparison, the first scaling factor SF1 and the second intermediate scaling factor SFb are 0.701 and 0.70, respectively, and the first scaling factor SF1 is larger than the second intermediate scaling factor SFb. Accordingly, the first scaling factor SF1 is decreased by a predetermined value of 0.001 (see S726). The first scaling factor SF1 is decreased to 0.70 (see S726). The first scaling module 450 outputs 0.70, which is the value of the first scaling factor SF1, as the second scaling factor SF2 (see S730).

The second scaling module 460 receives the global current value GC, the frame load value FL, and the second scaling factor SF2 (see S510 to S530). The global current value GC received by the second scaling module 460 is 15.00 amperes (A), the frame load value FL is 100%, and the second scaling factor SF2 is 0.70.

The second scaling module 460 calculates the target global current value (Target GC) corresponding to the frame load value FL with reference to the fourth lookup table LUT4 (see S540). Since the received frame load value FL is 100%, the target global current value (Target GC) is 15 amperes (A).

The second scaling module 460 compares the target global current value (Target GC) and the global current value GC (see S550). The target global current value (Target GC) is equal to the global current value GC. The second scaling module 460 maintains the second scaling factor SF2 (see S562). The second scaling factor SF2 is maintained at 0.700. The second scaling module 460 outputs the maintained second scaling factor SF2 value of 0.700 as the first scaling factor SF1 (see S570).

Meanwhile, the timing controller 140 may scale the first input image data IDATA by using the first scaling factor SF1. The timing controller 140 outputs the scaled second image data DATA by using the first scaling factor SF1. The second image data DATA is scaled by the first scaling factor SF1, so that the global current value GC sensed by the global current sensor 180 varies. The global current value GC is changed to a value obtained by multiplying 21.4 amperes (A) by 0.700, which is the first scaling factor SF1. Specifically, the global current value GC may decrease from 15.00 amperes (A), which is the directly previous global current value GC, to 14.98 amperes (A).

Through the above-described process, the display system DS according to the embodiments of the present disclosure stabilizes the global current value GC between 14.98 amperes and 15.00 amperes when displaying a full-white image in an environment of 50° C.

As described above, according to the embodiments of the present disclosure, even in an extreme environment in which the temperature and/or the frame load value FL are rapidly changed, the global current value GC flowing through the display panel 110 may be effectively controlled for a short period of time (for example, within several frames to several tens of frames). Accordingly, power consumption of the display system DS may be reduced by controlling the overcurrent to not flow through the display panel 110.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims. Therefore, those skilled in the art will understand that various modifications and other equivalent embodiments of the present disclosure are possible.

What is claimed is:

1. A display driving integrated circuit, comprising:

a compensation circuit including an analog-to-digital converter configured to convert an analog sensing voltage from a reference voltage line connected to a pixel circuit into a digital sensing value;

a logic circuit receiving a global temperature inputted from a temperature sensor, generating a local temperature based on the digital sensing value, generating temperature data based on the global temperature data and the local temperature, generating a first scaling factor based on a global current value inputted from a current sensor, the temperature data, and first image data;

a timing controller scaling the first image data based on the first scaling factor to generate second image data; and a data driving circuit generating a data voltage based on the second image data.

2. The display driving integrated circuit of claim 1, wherein the logic circuit comprises:

a compensation circuit interlocking module that generates a local current value from the digital sensing value;

a first logic circuit that compares the local current value with a reference current value to calculate the local temperature;

a second logic circuit that generates the temperature data based on the global temperature and the local temperature;

a third logic circuit that calculates a frame load value based on the first image data;

a first scaling circuit that receives the temperature data, the frame load value, and the first scaling factor over a plurality of frames, calculates a first intermediate scaling factor corresponding to the temperature data, calculates a second intermediate scaling factor corresponding to the temperature data and the frame load value, and generates and outputs a second scaling factor based on a difference value between the temperature data received over the plurality of frames and a comparison result of comparing the first scaling factor and the second intermediate scaling factor; and a second scaling circuit that receives the frame load value, the second scaling factor, and the global current value, calculates a target global current value corresponding to the frame load value, and generates and outputs the first scaling factor based on a comparison result of comparing the global current value and the target global current value.

3. A display device comprising:

a display panel comprising a pixel including a pixel circuit that is connected to a data line and a reference voltage line;

a compensation circuit including an analog-to-digital converter configured to convert a sensed analog sensing voltage from the reference voltage line into a digital sensing value;

a global temperature sensor that measures an ambient temperature of the display panel to generate a global temperature;

a global current sensor that measures an amount of current flowing through the display panel to generate a global current value;

a logic circuit that generates a local temperature based on the digital sensing value, generates temperature data based on the global temperature data and the local temperature, generates a first scaling factor based on the temperature data, the global current value, and first image data;

a timing controller scaling the first image data based on the first scaling factor to generate second image data; and a data driving circuit that generates a data voltage based on the second image data for driving the data line.

4. The display device of claim 3, wherein the logic circuit comprises:

a compensation circuit interlocking module that generates a local current value from the digital sensing value;

a first logic circuit that compares the local current value with a pre-stored reference current value to calculate the local temperature; and a second logic circuit that generates the temperature data based on the global temperature and the local temperature.

5. The display device of claim 4, wherein the logic circuit further includes a third logic circuit that calculates a frame load value based on the first image data.

6. The display device of claim 5, wherein the logic circuit further comprises:

a first scaling circuit that receives the temperature data, the frame load value, and the first scaling factor over a plurality of frames, calculates a first intermediate scaling factor corresponding to the temperature data, calculates a second intermediate scaling factor corresponding to the temperature data and the frame load value, and generates and outputs a second scaling factor based on a difference value between the temperature data received over the plurality of frames and a comparison result of comparing the first scaling factor and the second intermediate scaling factor; and a second scaling circuit that receives the frame load value, the second scaling factor, and the global current value, calculates a target global current value corresponding to the frame load value, and generates the first scaling factor based on a comparison result of comparing the global current value and the target global current value.

7. The display device of claim 6, wherein the second scaling circuit calculates the target global current value corresponding to the frame load value with reference to a fourth lookup table, compares the calculated target global current value and the received global current value, and maintains, increases, or decreases the second scaling factor according to a result of comparing the target global current value and the global current value to output the second scaling factor as the first scaling factor.

8. The display device of claim 7, wherein the first scaling circuit calculates the first intermediate scaling factor corresponding to the temperature data with reference to a second lookup table, and calculates the second intermediate scaling factor corresponding to the temperature data and the frame load value with reference to a third lookup table.

9. The display device of claim 8, wherein the first scaling circuit calculates the difference value between the temperature data obtained over the plurality of frames, and compares the calculated difference value with a predetermined reference value.

10. The display device of claim 9, wherein the first scaling circuit compares the first scaling factor and the second intermediate scaling factor when the calculated difference value is less than the reference value, maintains the first scaling factor when the second intermediate scaling factor is equal to the first scaling factor, increases the first scaling factor when the second intermediate scaling factor is greater than the first scaling factor, decreases the first scaling factor when the second intermediate scaling factor is less than the first scaling factor, and outputs the first scaling factor that is maintained, increased, or decreased as the second scaling factor.

11. The display device of claim 9, wherein the first scaling circuit compares the first scaling factor and the second intermediate scaling factor when the calculated difference value is equal to or greater than the reference value, outputs the first scaling factor as the second scaling factor when the second intermediate scaling factor is equal to the first scaling factor, and outputs the first intermediate scaling factor as the second scaling factor when the second intermediate scaling factor is different from the first scaling factor.

12. The display device of claim 3, wherein at least one of the data driving circuit, the timing controller, and the compensation circuit is mounted on an integrated circuit.

13. The display device of claim 12, wherein the display panel includes a display area in which the pixel is disposed and a non-display area around the display area, and the display device further includes a circuit film having one side attached to the non-display area and in which a display driving integrated circuit and the global current sensor are disposed.

14. The display device of claim 13, further comprising a flexible circuit board attached to the other side of the circuit film and in which the global temperature sensor is disposed.

15. A display system comprising:

a host outputting first image data;

a display panel comprising a pixel including a pixel circuit electrically connected to a data line and a reference voltage line;

a compensation circuit including an analog-to-digital converter configured to convert a sensed analog sensing voltage from the reference voltage line into a digital sensing value;

a global temperature sensor that measures an ambient temperature of the display panel to generate a global temperature;

a global current sensor that measures an amount of current flowing through the display panel to generate a global current value;

a logic circuit that generates a local temperature based on the digital sensing value, generates temperature data based on the global temperature data and the local temperature, generates a first scaling factor based on the temperature data, the global current value, and first image data;

a timing controller scaling the first image data based on the first scaling factor to generate second image data; and a data driving circuit generating a data voltage based on the second image data for driving the data line.

16. The display system of claim 15, wherein the global temperature sensor and the host are implemented in one integrated circuit.

17. The display system of claim 15, wherein the logic circuit comprises:

a compensation circuit interlocking module that generates a local current value from the digital sensing value;

a first logic circuit that compares the local current value with a reference current value to calculate the local temperature;

a second logic circuit that generates the temperature data based on the global temperature data and the local temperature;

a third logic circuit that calculates a frame load value based on the first image data;

a first scaling circuit that receives the temperature data, the frame load value, and the first scaling factor over a plurality of frames, calculate a first intermediate scaling factor corresponding to the temperature data, calculates a second intermediate scaling factor corresponding to the temperature data and the frame load value, and generates and outputs a second scaling factor based on a difference value between the temperature data received over the plurality of frames and a comparison result of comparing the first scaling factor and the second intermediate scaling factor; and a second scaling circuit that receives the frame load value, the second scaling factor, and the global current value, calculates a target global current value corresponding to the frame load value, and generates and outputs the first scaling factor based on a result of comparing the global current value and the target global current value.

18. The display system of claim 17, wherein the second scaling circuit calculates a target global current value corresponding to the frame load value with reference to a fourth lookup table, compares the calculated target global current value and the received global current value, and maintains, increases, or decreases the second scaling factor according to a result of comparing the target global current value and the global current value to output the second scaling factor as the first scaling factor, and the first scaling circuit calculates a first intermediate scaling factor corresponding the temperature data with reference to a second lookup table, and calculates a second intermediate scaling factor corresponding the temperature data and the frame load value with reference to a third lookup table.

19. A driving method of a display system, wherein the display system includes a first scaling circuit and a second scaling circuit, the driving method comprising:

receiving, by the second scaling circuit, a global current value, a frame load value, and a second scaling factor;

calculating, by the second scaling circuit, a target global current value corresponding to the frame load value;

comparing the target global current value and the global current value to generate a result;

adjusting, by the second scaling circuit, the second scaling factor according to the result to set a first scaling factor for scaling image data for the display system;

receiving, by the first scaling circuit, temperature data, the frame load value, and the first scaling factor;

calculating, by the first scaling circuit, a first intermediate scaling factor corresponding to the temperature data;

calculating, by the first scaling circuit, a second intermediate scaling factor corresponding to the temperature data and the frame load value; and comparing, by the first scaling circuit, the first scaling factor and the second intermediate scaling factor for generating the second scaling factor.

20. The driving method of the display system of claim 19, further comprising:

calculating a difference value between temperature data obtained over a plurality of frames; and comparing the calculated difference value with a preset reference value, wherein when the calculated difference value is less than the reference value, performing one of maintaining the first scaling factor, increasing the first scaling factor, and decreasing the first scaling factor according to a comparison result of comparing the first scaling factor and the second intermediate scaling factor, and when the calculated difference value is greater than or equal to the reference value, performing one of outputting the first scaling factor as the second scaling factor and outputting the first intermediate scaling factor as the second scaling factor is performed according to the comparison result of comparing the first scaling factor and the second intermediate scaling factor.

* * * * *